US012711726B2

(12) United States Patent
Lee et al.

(10) Patent No.: US 12,711,726 B2
(45) Date of Patent: Aug. 18, 2026

(54) ELECTRONIC DEVICE, OPERATING METHOD AND COMPUTER READABLE STORAGE MEDIUM FOR PROVIDING POST MASKING WITHIN IMAGE WHEN SHOOTING VIDEO

(71) Applicant: SAMSUNG ELECTRONICS CO., LTD., Suwon-si (KR)

(72) Inventors: Sanghun Lee, Suwon-si (KR); Sungoh Kim, Suwon-si (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 18/121,890

(22) Filed: Mar. 15, 2023

(65) Prior Publication Data

US 2023/0410456 A1 Dec. 21, 2023

Related U.S. Application Data

(63) Continuation of application No. PCT/KR2023/003199, filed on Mar. 8, 2023.

(30) Foreign Application Priority Data

Jun. 15, 2022 (KR) ........................ 10-2022-0073118
Aug. 18, 2022 (KR) ........................ 10-2022-0103651

(51) Int. Cl.
*G06V 10/00* (2022.01)
*G06V 10/25* (2022.01)
*G06V 10/82* (2022.01)

(52) U.S. Cl.
CPC .............. *G06V 10/25* (2022.01); *G06V 10/82* (2022.01); *G06V 2201/07* (2022.01)

(58) Field of Classification Search
CPC .... G06V 10/25; G06V 10/82; G06V 2201/07; G06V 40/161
See application file for complete search history.

(56) References Cited

U.S. PATENT DOCUMENTS 8,705,936 B2 4/2014 Takahashi et al.
10,008,240 B2 6/2018 Koide et al.
(Continued)

FOREIGN PATENT DOCUMENTS

CN 105957001 A 9/2016
CN 109427082 A 3/2019
(Continued)

OTHER PUBLICATIONS

Lee scalabel rate control for mpeg-4 video, IEEE Transactions on Circuits and Systems for Video Technology, vol. 10, No. 6 (Year: 2000).*

(Continued)

*Primary Examiner* — Xiao Liu
(74) *Attorney, Agent, or Firm* — Sughrue Mion, PLLC

(57) ABSTRACT

An electronic device includes a processor configured to: store a masking review image and store an image after the masking review image is stored, identify a first visual object of the image, store the identified first visual object of the image, identify a second visual object in the masking review image. The second visual object corresponds to the identified first visual object. The processor is further configured to: store the identified second visual object, perform a masking on the image based on first data corresponding to the first visual object, perform a masking on the masking review image based on second data corresponding to the second visual object, and encode the masking review image based on a remaining capacity of a storage device. The
(Continued)

remaining capacity of the storage device is smaller than a designated reference capacity.

9 Claims, 19 Drawing Sheets

(56) References Cited

U.S. PATENT DOCUMENTS

| | | | | |
|---|---|---|---|---|
| 10,791,263 | B1 | 9/2020 | Hwang et al. | |
| 11,244,448 | B2 | 2/2022 | Grimmer et al. | |
| 11,468,571 | B2 | 10/2022 | Cho et al. | |
| 2005/0152579 | A1 | 7/2005 | Park et al. | |
| 2010/0183227 | A1 | 7/2010 | Park et al. | |
| 2012/0008915 | A1* | 1/2012 | Takahashi | H04N 23/635 386/E5.003 |
| 2014/0023248 | A1 | 1/2014 | Yoo et al. | |
| 2021/0012503 | A1* | 1/2021 | Cho | G06F 18/24 |
| 2021/0233371 | A1 | 7/2021 | Brake et al. | |
| 2021/0383018 | A1* | 12/2021 | Keskikangas | G06F 21/6209 |
| 2022/0122294 | A1* | 4/2022 | Nyström | H04N 19/132 |
| 2022/0327732 | A1 | 10/2022 | Shimuachi | |
| 2023/0360254 | A1* | 11/2023 | Liu | G06V 20/10 |

FOREIGN PATENT DOCUMENTS

| | | | |
|---|---|---|---|
| CN | 113793368 | A | 12/2021 |
| JP | 4650579 | B2 | 3/2011 |
| JP | 2021-033573 | A | 3/2021 |
| KR | 10-0601933 | B1 | 7/2006 |
| KR | 10-1215650 | B1 | 12/2012 |
| KR | 10-1484844 | B1 | 1/2015 |
| KR | 10-1639258 | B1 | 7/2016 |
| KR | 10-2082235 | B1 | 2/2020 |
| KR | 10-2123248 | B1 | 6/2020 |
| KR | 10-2147187 | B1 | 8/2020 |
| KR | 10-2183689 | B1 | 11/2020 |
| KR | 10-2021-0007276 | A | 1/2021 |
| KR | 10-2021-0041758 | A | 4/2021 |
| KR | 10-2299564 | B1 | 9/2021 |

OTHER PUBLICATIONS

International Search Report and Written Opinion (PCT/ISA/210 and PCT/ISA/237) dated Jun. 14, 2023, issued by International Searching Authority for International Application No. PCT/KR2023/003199.

* cited by examiner

ELECTRONIC DEVICE, OPERATING METHOD AND COMPUTER READABLE STORAGE MEDIUM FOR PROVIDING POST MASKING WITHIN IMAGE WHEN SHOOTING VIDEO

CROSS-REFERENCE TO RELATED APPLICATION(S)

This application is a continuation application, claiming priority under § 365(c), of an International application No. PCT/KR2023/003199, filed on Mar. 8, 2023, which is based on and claims the benefit of a Korean patent application number 10-2022-0103651, filed on Aug. 18, 2022, in the Korean Intellectual Property Office, and of a Korean patent application number 10-2022-0073118, filed on Jun. 15, 2022, in the Korean Intellectual Property Office, the disclosure of each of which is incorporated by reference herein in its entirety.

BACKGROUND

1. Field

The disclosure relates to an electronic device, an operating method, and a computer readable storage medium for providing post-masking within an image when shooting a video.

2. Description of Related Art

As services that shoot videos using cameras in portable electronic devices and share videos with others become common, a problem in which privacy is exposed has occurred. In order to solve the privacy exposure problem, parts (e.g., objects, such as thing, letter, and/or encryption code, which may correspond to human faces, license plates of vehicles, and home addresses) of the video that require privacy protection may be masked.

SUMMARY

One or more embodiments of the disclosure may identify privacy factors and store images in a storage device (e.g., a buffer) while shooting a video. According to one or more embodiments, when the privacy element is identified, at least one processor may search for the same privacy element among images stored in a temporary storage device to store information based on the privacy element and perform masking. One or more embodiments of the disclosure may perform masking or release masking on a video that has already been shot according to information based on a privacy element.

The technical problems to be achieved in this document are not limited to those described above, and other technical problems not mentioned herein will be clearly understood by those having ordinary knowledge in the art to which the disclosure belongs, from the following description.

According to an aspect of the disclosure, an electronic device includes: a processor; a camera electrically connected to the processor; and a first storage device and a second storage device electrically connected to the camera and the processor. The processor is configured to: obtain an image through the camera, store a masking review image in the first storage device, and store the obtained image in the first storage device. The masking review image is stored in the first storage device before the image is stored in the first storage device. The processor is further configured to: identify a first visual object of the image, store the identified first visual object of the image in the second storage device, identify a second visual object in the masking review image. The second visual object corresponds to the identified first visual object. The processor is further configured to: store the identified second visual object in the second storage device, perform a masking on the image based on first data corresponding to the first visual object, perform a masking on the masking review image based on second data corresponding to the second visual object, and encode the masking review image based on a remaining capacity of the first storage device. The remaining capacity of the first storage device is smaller than a designated reference capacity.

According to another aspect of the disclosure, an electronic device includes: a processor; a camera electrically connected to the processor; and a first storage device and a second storage device electrically connected to the camera and the processor. The processor is configured to: obtain an image through the camera, store a masking review image in the first storage device, and store the obtained image in the first storage device. The masking review image is stored before the image is stored in the first storage device. The processor is further configured to: identify a first visual object of the image, identify a second visual object in the masking review image. The second visual object corresponds to the identified first visual object. The processor is further configured to: store first data corresponding to the first visual object in the image, store second data corresponding to the second visual object in the masking review image, encode the masking review image based on a remaining capacity of the first storage device, the remaining capacity being smaller than a designated reference capacity, and perform a masking on the encoded masking review image, based on the first data and the second data.

According to another aspect of the disclosure, a computer readable storage medium stores one or more programs, the one or more programs includes instructions which, when executed by a processor of an electronic device, cause the electronic device to: obtain an image, store a masking review image in a first storage device, and store the obtained image in the first storage device after the masking review image is stored, identify a first visual object of the image and store the identified first visual object of the image in a second storage device, identify a second visual object in the masking review image, which corresponds to the identified first visual object, store the identified second visual object in the second storage device, perform a masking on the image based on data corresponding to the first visual object, perform a masking on the masking review image based on data corresponding to the second visual object, and encode the masking review image based on a remaining capacity of the first storage device. The remaining capacity of the first storage device is smaller than a designated reference capacity.

Provided are an electronic device and a method that identify a privacy element using a storage device. According to one or more embodiments, when a privacy masking target is detected at a specific time point, at least one processor can identify whether the same masking target exists for previous images stored in the storage device to obtain information about the masking target. And the at least one processor can perform masking.

The effects that can be obtained from the disclosure are not limited to those described above, and any other effects not mentioned herein will be clearly understood by those having ordinary knowledge in the art to which the disclosure belongs, from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Privacy masking refers to a method of preventing others from identifying the user's direct personal information in a video, or identifying an object (or a part of the video) that indirectly reveals personal information. The privacy masking method may include a method of replacing the object, or a part of the video with another video or mosaic processing. Hereinafter, masking indicates privacy masking. Hereinafter, the masking target indicates a protected object or a protected object for privacy protection. The masking target may be referred to as a first visual object when in an image. The masking target may be referred to as a second visual object when it is in the masking review image. The video may be configured with a plurality of images. Hereinafter, an image indicates one of the plurality of images configuring a video. Metadata may include data for the first visual object and data for the second visual object.

Figure 1:
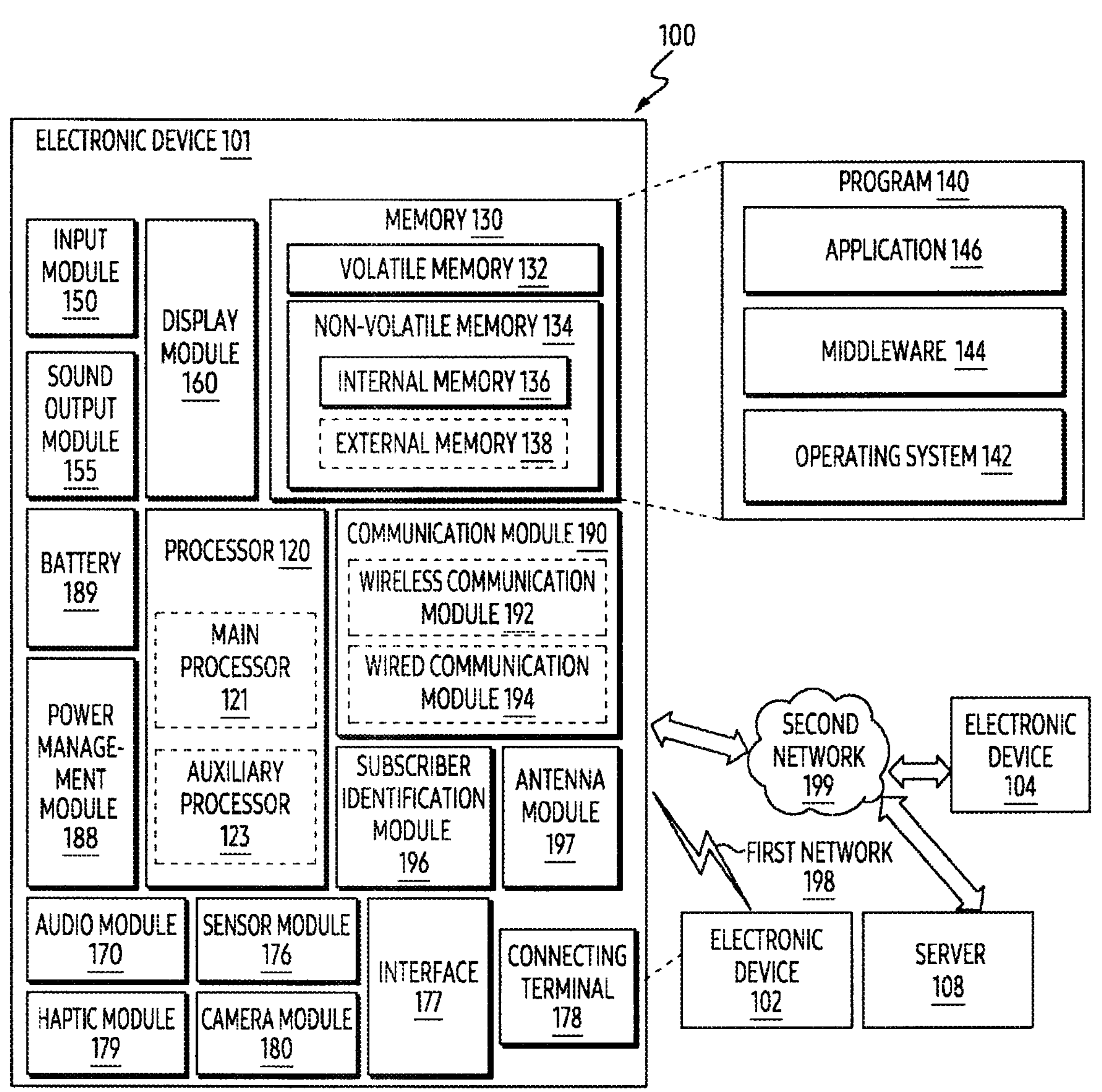
FIG. 1 is a block diagram of an electronic device in a network environment, according to one or more embodiments.

FIG. 1 is a block diagram illustrating an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 performs a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on communication technology or IoT-related technology.

Figure 2:
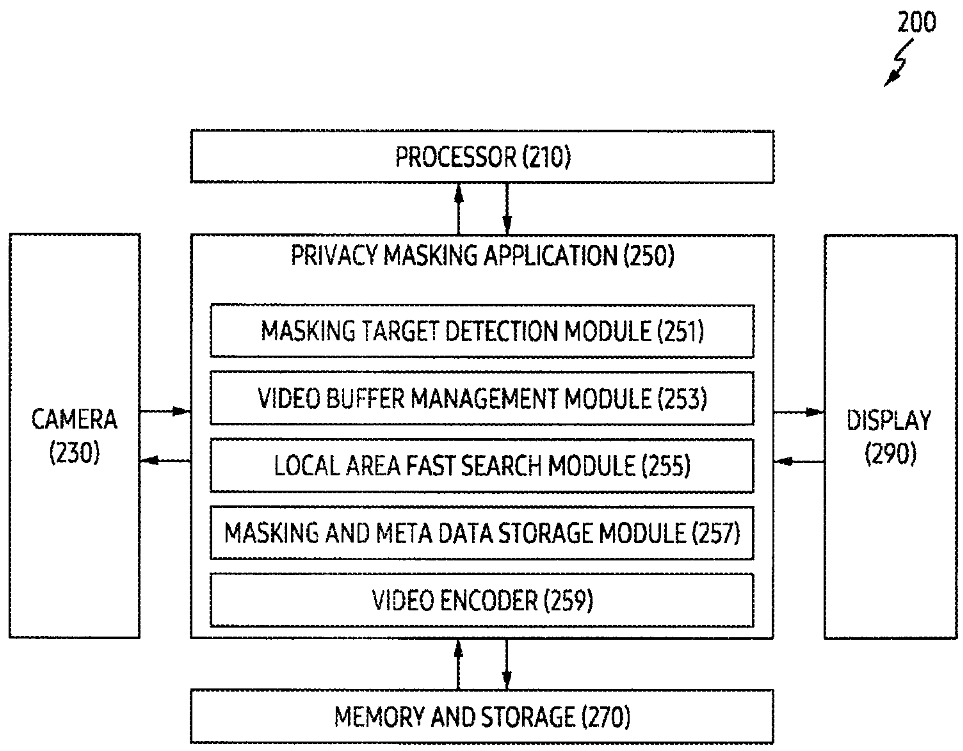
FIG. 2 is a block diagram of a functional configuration of an electronic device, according to one or more embodiments.

FIG. 2 is a block diagram of a functional configuration of an electronic device, according to one or more embodiments.

The electronic device 200 of FIG. 2 may be at least partially similar to the electronic device 101 of FIG. 1 or may further include other embodiments of the electronic device.

Referring to FIG. 2, the electronic device 200 (e.g., the electronic device 101 in FIG. 1) may include a camera 230 (e.g., the camera module 180 of FIG. 1) for shooting a video, a display 290 (e.g., the display module 160 of FIG. 1), a processor 210 (e.g., the processor 120 of FIG. 1) for performing an application operation, a privacy masking application 250 (e.g., the application 146 in FIG. 1), and a memory and storage device 270 (e.g., the memory 130 in FIG. 1). The privacy masking application 250 may include a masking target detection module 251, a video buffer management module 253, a local area fast search module 255, a masking and metadata storage module 257, and a video encoder 259.

According to one or more embodiments, the privacy masking application 250 may be implemented in the form of hardware, software, or a combination of hardware and software. When implemented as software, a computer-readable storage medium storing one or more programs (software modules) may be provided. The one or more programs stored in the computer-readable storage medium are configured for execution by one or more processors in the electronic device. The one or more programs include instructions that cause the electronic device to execute methods according to embodiments described in the claims or specification of this disclosure.

These programs (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile discs (DVDs) or other forms of optical storage, or magnetic cassette. Otherwise, it may be stored in a memory composed of a combination of some or all of these. In addition, a plurality of each configuration memory may be included.

The masking target detection module 251 may detect the position and size of a masking target in the image. The masking target detection module 251 refers to a module for detecting a masking target. According to one or more embodiments, the masking target may be an object (e.g., human body, things, and/or letters) capable of identifying one's own face or another person's face, a vehicle license plate, or a home address, or an object (e.g., things, letters, and/or encryption codes) capable of identifying a phone number. In addition, the masking target may be determined based on a user's input. According to one or more embodiments, the masking target detection module 251 may include at least one of a module for identifying a face, a module for identifying a vehicle license plate, a module for identifying a letter, a module for analyzing a word or sentence, or a module for identifying an encryption code or a sign, but is not limited to the above-described examples.

According to one or more embodiments, the modules may identify a masking target based on a trained neural network. In addition, a plurality of modules for identification may be used in parallel. The neural network may refer to a model having the ability to solve a problem by changing the combination intensity of the synapses based on training nodes forming a network through coupling of synapses. The neural network may be trained through supervised learning or unsupervised learning. For example, the supervised learning may refer to learning performed by providing a label (or correct answer). For another example, the unsupervised learning may refer to learning performed without a label.

The video buffer management module 253 may store or manage an image of a previous frame. The video buffer management module 253 may be a module for managing a buffer. The video buffer management module 253 may be a module for storing images configuring video in a buffer, which is a storage device, before being encoded. The video buffer management module 253 may perform functions such as addition, deletion, and order management of images in the buffer, which is the storage device. The buffer may refer to a ring buffer or a flat buffer.

The local area fast search module 255 may additionally search for a masking target in the buffer. The local area fast search module 255 refers to a module for searching a local area at high speed. The local area fast search module 255 may search whether a corresponding masking target exists in images before the masking target detection time stored in the buffer, which is the storage device, based on the location and size of the masking target already detected in the images. The local area fast search module 255 may use an operation different from the operation used by the masking target detection module 251 to detect a masking target not detected by the masking target detection module 251. The local area fast search module 255 may use an operation for post-processing an image based on the masking target detection module 251.

The masking and metadata storage module 257 may perform masking or store information on masking detection as metadata, based on the result of the masking target detection. The metadata is structured data about data and may include data describing other data. The masking and metadata storage module 257 may store data for a masking target detected by the masking target detection module 251 or the local area fast search module 255. The masking and metadata storage module 257 may provide the data to the processor to utilize data for the masking target after encoding.

The video encoder 259 may encode images configuring video. According to one or more embodiments, images input to the video encoder 259 may be images obtained by performing at least some masking on a masking target. According to other embodiments, the images input to the video encoder 259 may be images on which masking is not performed on the masking target.

Figure 3A:
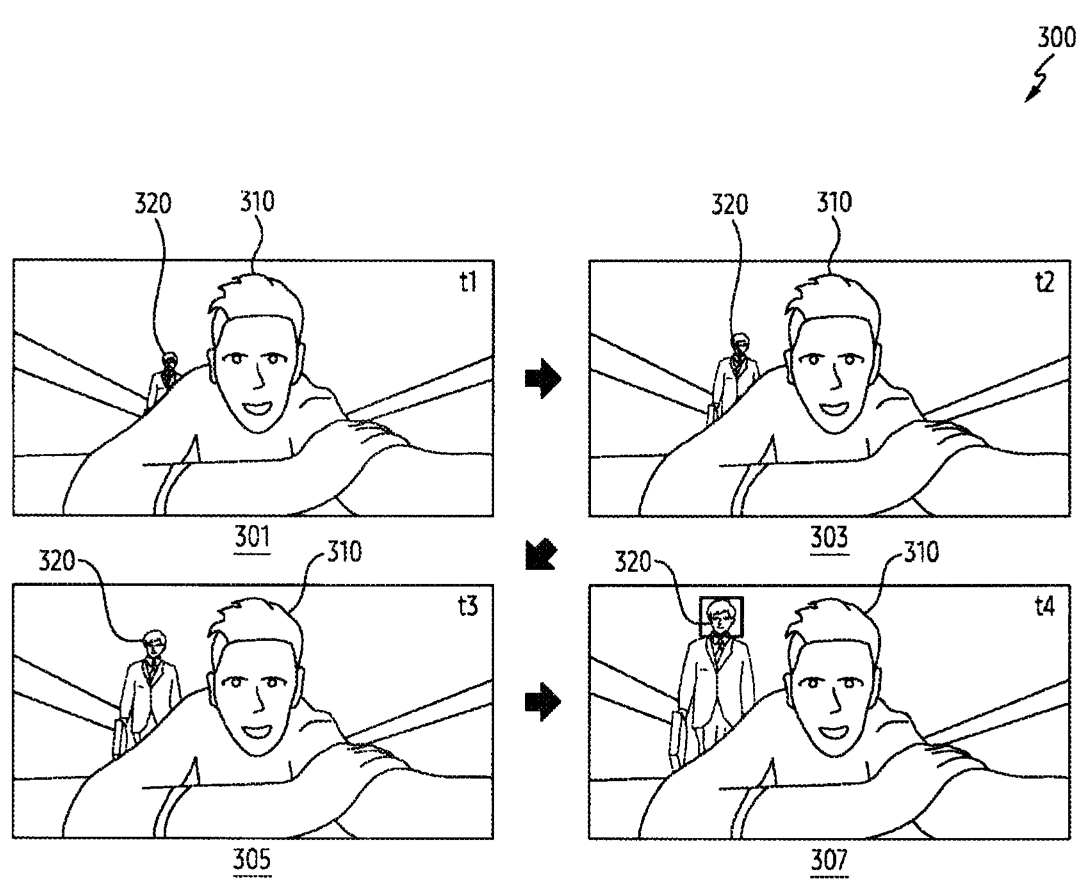
FIG. 3A illustrates a masking technique without post processing, according to a comparative embodiment.

FIG. 3A illustrates a masking technique without post processing, according to a comparative embodiment. The post processing refers to a procedure for determining whether to perform masking processing not only on a visual object of an obtained image, but also on a visual object of an image obtained before the obtained image.

Referring to FIG. 3A, sequential images 300 illustrate a situation in which a video masking technology is applied. According to a comparative embodiment, the electronic device may obtain images in the order of the first image 301, the second image 303, the third image 305, and the fourth image 307. For example, the electronic device may obtain the first image 301 at the first time point (e.g., t1), the second image 303 at the second time point (e.g., t2), the third image 305, and the fourth image 307 at the fourth time point (e.g., t4). The order of the first image 301, the second image 303, the third image 305, and the fourth image 307 indicates that the face of another person, which is the masking target 320, gradually approaches the main subject 310 in the center and the camera 230 in FIG. 2. In the fourth image 307, at least one processor may identify a face of another person, which is the masking target.

According to the video masking technology that uses only the masking target detection module, a difference may exist between the module's ability to identify a masking target and a general person's ability to identify a masking target. For example, a difference may occur between a time when a general person identifies a masking target in an image and a time when the module for identifying the masking target identifies the masking target. According to the video masking technology that uses only the masking target detection module, masking may be performed only when the module identifies the masking target in the image. Therefore, privacy protection may be difficult because masking is not performed on images corresponding to a time point from when a general person identifies the masking target to before the time point when the module identifies the masking target. Therefore, the performance of the application for privacy protection may be determined depending on the performance of the module for identifying the masking target.

According to one or more embodiments, the privacy masking application 250 may additionally use a module (e.g., the video buffer management module 253) for storing images of the video and a module (e.g., local area fast search module 255) for searching whether there is a masking target in the search area, compared to the masking technology that uses only the masking target detection module. The module may increase the performance of the privacy protection application. The video buffer management module 253 can manage storage, deletion, and search of videos in the storage device 270 (e.g., memory).

For example, each of the first image 301, the second image 303, the third image 305, and the fourth image 307 is images in which the main subject 310 in the center and another person are shot. The module for identifying the masking target 320 may identify the masking target 320 (e.g., a face of another person) in the fourth image 307. In the first image 301, the second image 303, and the third image 305, it is highly likely that a general person identifies the masking target 320 (e.g., the face of another person). Therefore, the masking target 320 (e.g., the face of another person) needs to be masked in the first image 301, the second image 303, and the third image 305 to protect privacy. However, according to the video masking technology using only the masking target detection module (i.e., video masking technology without post processing), privacy masking may not be performed in the first image 301, the second image 303, and the third image 305. In each of the first image 301, the second image 303, and the third image 305, the masking target 320 needs to be manually designated by the user to protect privacy.

Figure 3B:
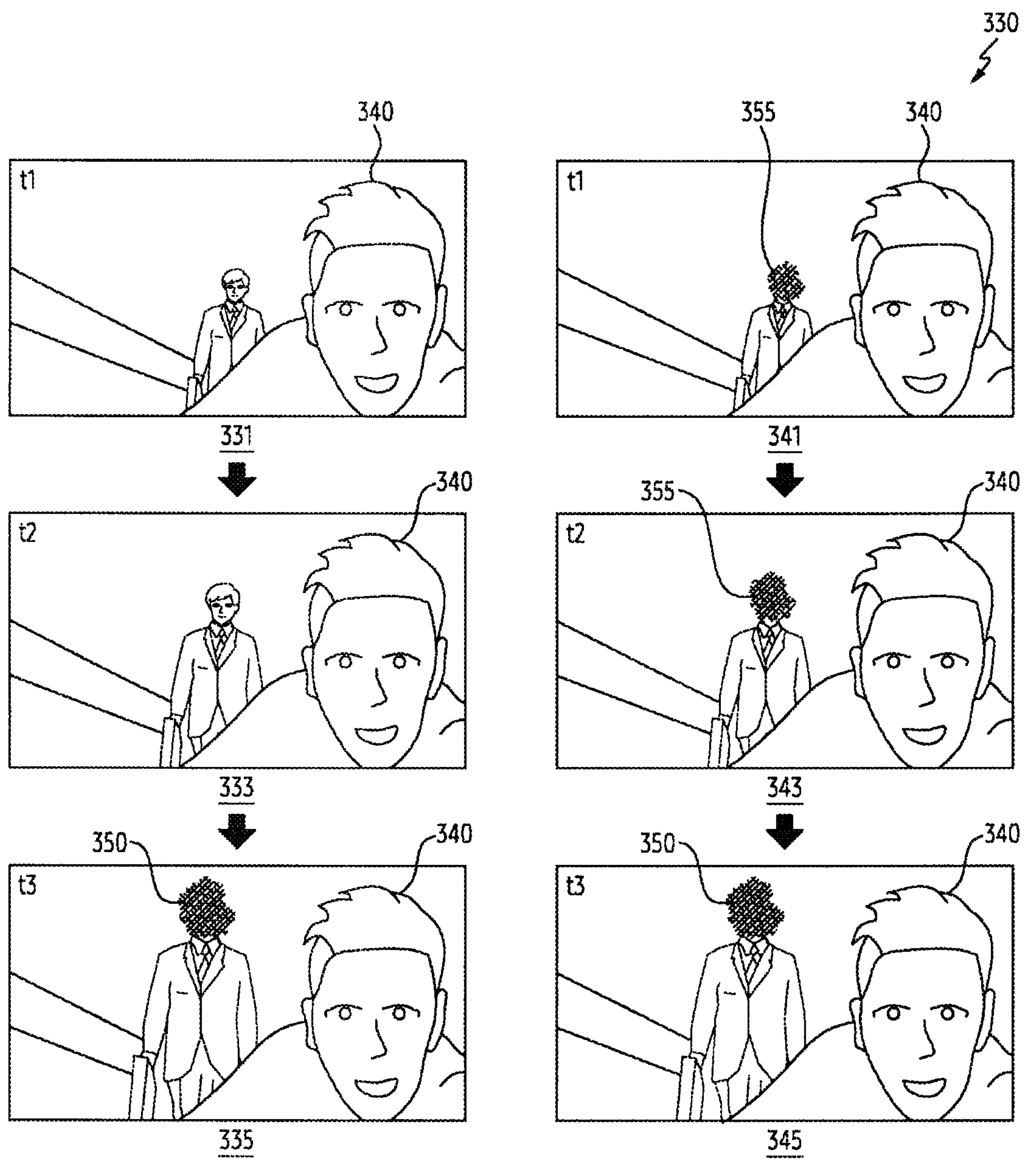
FIG. 3B illustrates an example of images according to masking, according to one or more embodiments.

FIG. 3B illustrates an example of images according to masking, according to one or more embodiments.

Referring to FIG. 3B, according to one or more embodiments, sequential images 330 illustrate an example of an image displayed on a display (e.g., the display 290 of FIG. 2) and an example of an image stored through an encoding and masking process. The image 331, the image 333, and the image 335 are images obtained from the camera. The order of the image 331, the image 333, and the image 335 indicates that the main subject 340 in the center and the face of another person, which is the masking target 320, gradually approach the camera (e.g., the camera 230 of FIG. 2). The image 331, the image 333, and the image 335 may be displayed on a display that may be checked by a user during video shooting. The image 341, the image 343, and the image 345 are images stored through encoding and masking process. The image 331 may have been taken at time t1. The image 333 may have been taken at time t2. The image 335 may have been taken at time t3. The image 341 may be an image taken at time t1 and stored through encoding and masking processes. The image 343 may be an image taken at time t2 and stored through encoding and masking processes. The image 345 may be an image taken at time t3 and stored through encoding and masking processes.

At least one processor may identify a first visual object 350 that is a masking target in the image 335. The image 331 and the image 333 are transmitted on the display without masking on the masking target. However, the at least one processor may identify images before the image 335 based on a video buffer management module (e.g., the video buffer management module 253 of FIG. 2). By the video buffer management module, a video may be stored in the storage device 270 (e.g., memory), a video may be deleted from the storage device 270, or a video may be searched by referring to the storage device 270. The video buffer management module may identify images before the image 335, based on the storage device 270.

For example, the video buffer management module may search for images 331 and 333, which are masking review images, from the storage device 270 based on the image 335. The at least one processor may identify a second visual object 355 corresponding to the first visual object 350 from the identified images (e.g., image 331 and image 333). In other words, the at least one processor may identify the masking review images (e.g., the second visual object 355 that is the masking target in image 341 and image 343). The at least one processor may perform masking (hereinafter, post-masking) on the second visual object 355. The at least one processor may encode each of the identified images (e.g., image 331 and image 333).

The order of the stored images 341, 343, and 345 indicates that the main subject 340 in the center and the face of another person, which is a masking target, gradually approach the camera (e.g., the camera 230 of FIG. 2). A result of masking may be displayed in the image 341 and the image 343, which are stored images. According to one or more embodiments, when masking review images (e.g., image 341) and image 343) are masked based on image 345 in the privacy masking application, the at least one processor may display identification information called post masking on the display.

Figure 3C:
FIG. 3C illustrates examples of masking, according to one or more embodiments.
Figure 3C:
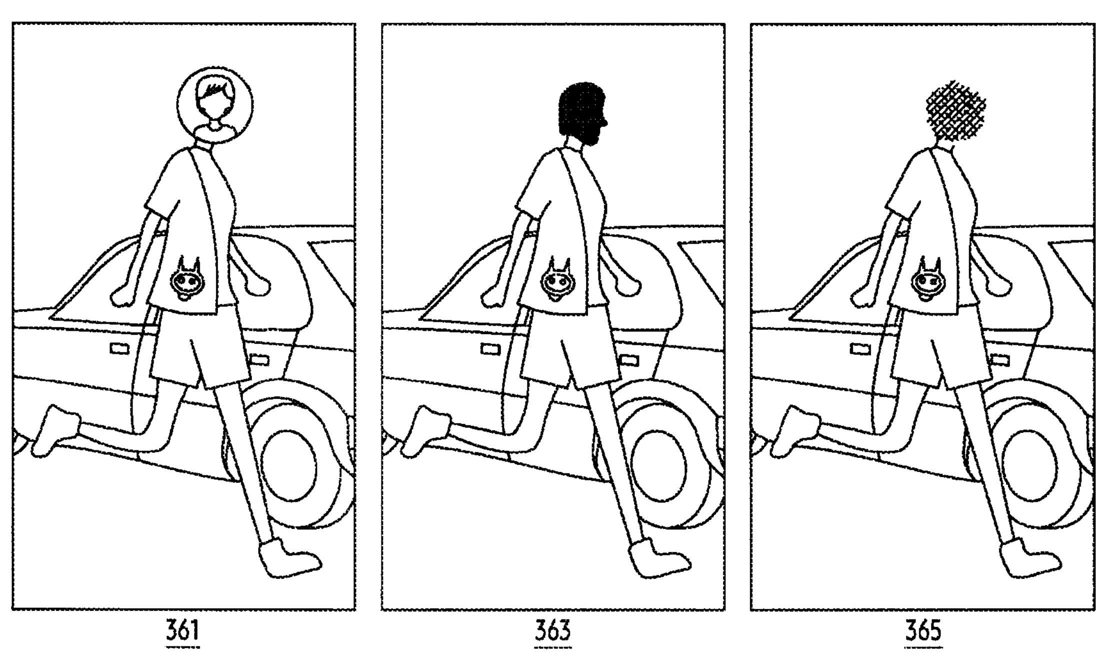

FIG. 3C illustrates examples of masking, according to one or more embodiments.

Referring to FIG. 3C, according to one or more embodiments, examples 360 of a masking method illustrate methods of performing masking. Image 361 illustrates a method of replacing a masking target with another icon.

According to one or more embodiments, characteristics such as the type and size of the icon may be determined in various ways. According to an embodiment, the shape of the icon may vary. For example, the icon may be an animal face shape. For example, the icon may be a skull shape. For example, the icon may be an emoticon. For example, the icon may be a flower shape.

According to an embodiment, the icon may be determined in various ways. For example, the icon may be determined by a user. For example, the icon may be created by a user. For example, the icon may be determined according to the type of the corresponding masking target.

According to an embodiment, the size of the icon may be determined based on various methods. For example, the icon may be individually determined according to an object corresponding to the masking target. For example, the size of the icon may be determined corresponding to the size of the masking target. For example, the size of the icon may be determined by a user. For example, the size of the icon may be determined according to the type of the corresponding masking target. For example, the size of the icon may be individually determined according to an object corresponding to the masking target.

The image 363 illustrates a method of replacing the masking target with a figure corresponding to the masking target. According to one or more embodiments, characteristics such as colors, sizes, and shapes of the figure corresponding to the masking target may be variously determined. According to an embodiment, the color of the corresponding figure may vary. For example, the color of the corresponding figure may be a color extracted from the image. For example, the color of the figure may be achromatic. For example, the color of the corresponding figure may be designated by a user. For example, the color of the corresponding figure may be determined according to the type of the corresponding masking target. For example, the color of the corresponding figure may be individually determined according to an object corresponding to the masking target.

According to an embodiment, the shape of the figure may vary. For example, the shape of the corresponding figure may be determined based on the silhouette of the masking target. For example, the shape of the corresponding figure may be a planar figure. For example, the shape of the corresponding figure may be a three-dimensional figure. For example, the shape of the corresponding figure may be determined by a user. For example, the shape of the corresponding figure may be determined according to the type of the corresponding masking target. For example, the shape of the corresponding figure may be individually determined according to the object corresponding to the masking target.

According to an embodiment, the size of the figure may be determined based on various methods. For example, the size of the corresponding figure may be determined based on the masking target. For example, the size of the corresponding figure may be determined by a user. For example, the size of the corresponding figure may be determined according to the type of the corresponding masking target. For example, the size of the corresponding figure may be individually determined according to the object corresponding to the masking target. For example, when the masking target is a human face, an area corresponding to the eye may be masked with a black square shape.

The image 365 illustrates how to mosaic a masking target. According to one or more embodiments, characteristics such as an area of the mosaic and a unit cell size may be variously determined. According to an embodiment, the area of the mosaic may be determined in various ways. For example, the area of the mosaic may be determined based on the area of the masking target. For example, the area of the mosaic may be determined based on a user's input. For example, the area of the mosaic may be individually determined according to the type of the masking target. For example, the area of the mosaic may be individually determined according to an object corresponding to the masking target.

According to an embodiment, the unit cell size of the mosaic may be determined in various ways. For example, the unit cell size of the mosaic may be determined based on a user input. For example, the unit cell size of the mosaic may be individually determined according to the type of masking target. For example, the unit cell size of the mosaic may be individually determined according to an object corresponding to the masking target. For example, when the masking target is a human face, an area corresponding to the eye may be mosaic in a square shape.

However, the above-described masking methods are only examples and are not limited to the above-described examples. The masking method may include methods in which the at least one processor processes an image so that a masking target cannot be identified.

Figure 4:
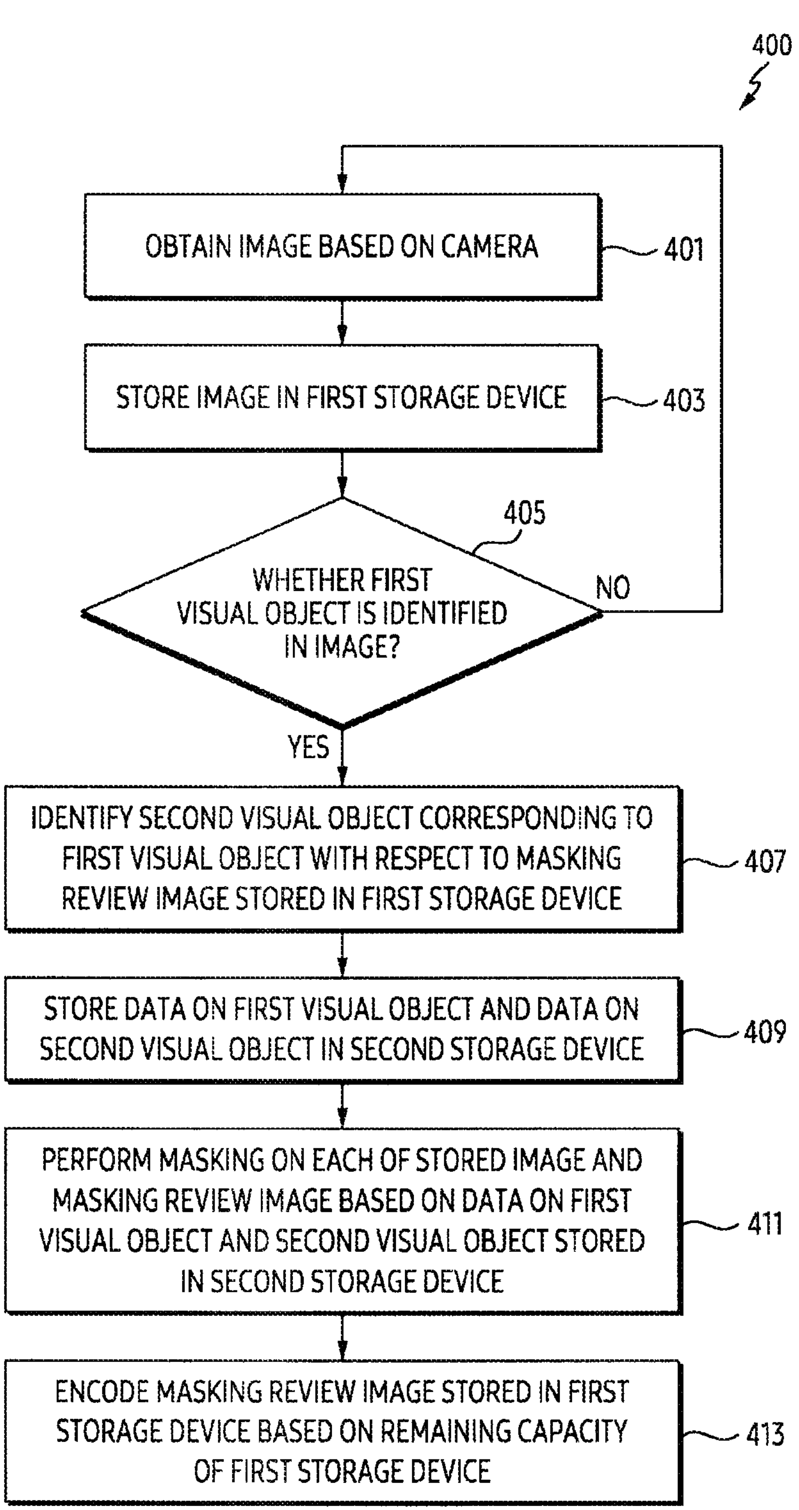
FIG. 4 is a flowchart illustrating an operation of an electronic device for performing masking, according to one or more embodiments.

FIG. 4 is a flowchart illustrating an operation of an electronic device for performing masking, according to one or more embodiments.

In the following embodiment, each operation may be sequentially performed, but is not necessarily sequentially performed. For example, the order of each operation may be changed, and at least two operations may be performed in parallel.

According to an embodiment, operations 401 to 413 may be understood to be performed in a processor (e.g., the processor 210 of FIG. 2) of an electronic device (e.g., the electronic device 200 of FIG. 2).

Referring to FIG. 4, operation flow 400 illustrates an operation flow of an electronic device for performing masking before encoding when a user shoots a video using a privacy masking application.

In operation 401, at least one processor may obtain an image based on a camera. The image may be the most recently obtained image based on the camera. The image may include a first visual object that becomes a masking target. According to one or more embodiments, the image may be an image targeted by the masking target detection module 251 (e.g., the masking target detection module 251 of FIG. 2) as a detection target.

In operation 403, the at least one processor may store an image in a first storage device. According to one or more embodiments, the first storage device may be included in the video buffer management module 253 (e.g., the video buffer management module 253 of FIG. 2). The first storage device may be a buffer for storing images configuring the video before images configuring the video are encoded. The buffer may refer to a ring buffer or a flat buffer. The buffer may indicate a memory. The buffer may indicate a video RAM. The buffer may indicate a storage. The at least one processor may store an image in the first storage device when a user shoots a video. And the at least one processor may encode the masking review image stored in the first storage device when the storage capacity of the first storage device reaches the designated capacity. The contents of the masking review images will be described later.

According to one or more embodiments, each of the images stored in the first storage device may be an I frame (infra frame). The I frame may refer to an image of a frame stored as an original input. The I frame may have a larger capacity than a P frame (predicted frame). The P frame may indicate a forward prediction frame. The P frame may predict and store data of a part different from the previous I frame. The P frame may have a smaller capacity than the I-frame. According to an embodiment, the at least one processor may store only an image corresponding to the I frame in the first storage device among images obtained through the camera. In this case, masking may be performed only on the I frame. The masking method using only I frames can reduce the consumption of computing resources and temporal resources compared to the masking method using both I frame and P frame.

In operation 405, the at least one processor may determine whether the first visual object is identified in the image. When the first visual object is identified, the at least one processor may perform operation 407. When the first visual object is not identified, the at least one processor may perform operation 401. According to one or more embodiments, the at least one processor may identify whether the image includes a first visual object corresponding to a masking target. For example, the masking target may be an object (e.g., human body, things, and/or letter) capable of identifying one's own face or another person's face, a vehicle license plate, or a home address, or an object (e.g., things, character, and/or encryption code) capable of identifying a phone number. According to an embodiment, the at least one processor may determine whether the first visual object is identified in the image by using a first operation. The first operation may be an operation for identifying a masking target. The first operation may use a neural network in which data of a specific category (an object (e.g., human body, things, and/or letter) capable of identifying one's own face or another person's face, a vehicle license plate, or a home address, or an object (e.g., things, character, and/or encryption code) capable of identifying a phone number) are previously learned.

In operation 407, the at least one processor may identify a second visual object corresponding to the first visual object with respect to the masking review image stored in the first storage device. The masking review images refer to images shot before a time point at which the image is shot. And the masking review image indicates an image stored in the first storage device. In other words, when the first visual object is identified, the at least one processor identifies whether the second visual object exists in the masking review image. For example, when a masking target (e.g., a human face) is identified in the image, the at least one processor may identify whether the face of the same person is identified in the masking review image photographed before the time point of identification. The at least one processor may identify whether the second visual object exists using a second operation. According to one or more embodiments, the electronic device using the second operation may compare keypoints of objects extracted from two different videos like an object tracking method. The operation for comparing keypoints may be suitable for tracking a part of a shape or object that is unclear to be classified into a specific category.

In operation 409, the at least one processor may store data on the first visual object and data on the second visual object in the second storage device. According to one or more embodiments, the data on the first visual object and the data on the second visual object may refer to metadata. For example, the metadata may be information related to a masking target. For example, the metadata may include at least one of the type and location of the masking target, the range in which masking is to be performed, whether masking is applied, whether masking is excluded, or mobility information of external objects corresponding to masking targets. For example, the metadata may include information that the masking target is another person's face and vehicle license plate, masking is performed, and the masking range is in a circle and a rectangle shape, and information on the masking location and size. However, the information included in the metadata is not limited to the above-described example.

According to one or more embodiments, the second electronic device may be included in the masking and metadata storage module 257 (e.g., the masking and metadata storage module 257 of FIG. 2). For example, the second storage device may indicate a memory. For example, the second storage device may indicate storage. For example, the second storage device may indicate a video RAM. According to one or more embodiments, the first storage device and the second storage device may be the same. For example, both the first storage device and the second storage device may be memory. For example, both the first storage device and the second storage device may indicate storage. For example, both the first storage device and the second storage device may indicate video RAM.

According to one or more embodiments, the first storage device and the second storage device may be different. For example, the first storage device may be a memory, and the second storage device may be a storage. For example, the first storage device may be storage, and the second storage device may be memory. According to one or more embodiments, the Meta data may be stored in a memory and then stored in a video file together with image encoding. The storage of the video file may follow a metadata standard of a video container or may follow a separate storage format. The video container refers to a structured format (e.g., an extension) for storing video data.

In operation 411, the at least one processor may perform masking on each of the image and the masking review image based on the data on the first visual object and the second visual object stored in the second storage device.

In operation 413, the at least one processor may encode the masking review image stored in the first storage device based on the remaining capacity of the first storage device. For example, the at least one processor may encode each image in the order entered among the masking review images stored in the first storage device. In other words, the at least one processor may sequentially encode the masking review image stored in the first storage device in a FIFO (first in first out) scheme. For another example, the at least one processor may encode each image in the opposite order of input from among the masking review images stored in the first storage device. In other words, the at least one processor may sequentially encode the masking review image stored in the second storage device in a LIFO (last in first out) scheme.

According to one or more embodiments, the at least one processor may encode the masking review image in the first storage device when the remaining capacity of the first storage device becomes less than or equal to the designated reference capacity. The first storage device of the designated capacity may delete the masking review image for which encoding has been performed. For example, the reference capacity may include at least one of the number of frames of video or the length of video. For example, the at least one processor may encode the masking review image when the remaining capacity of the first storage device remains less than or equal to about 500 frames. For example, the at least one processor may encode the masking review image when the remaining capacity of the first storage device remains less than about 5 minutes based on high definition (HD).

In operation 413, the at least one processor is described as performing encoding of the masking review image based on the remaining capacity of the first storage device, but embodiments of the disclosure are not limited thereto. According to another embodiment, the at least one electronic device may encode the masking review image based on the stored capacity of the first storage device.

In operation 413, the at least one processor is illustrated as encoding a single masking review image, but embodiments of the disclosure are not limited thereto. When the remaining capacity of the first storage device becomes less than or equal to the designated reference capacity, a plurality of masking review images may be encoded.

Figure 5A:
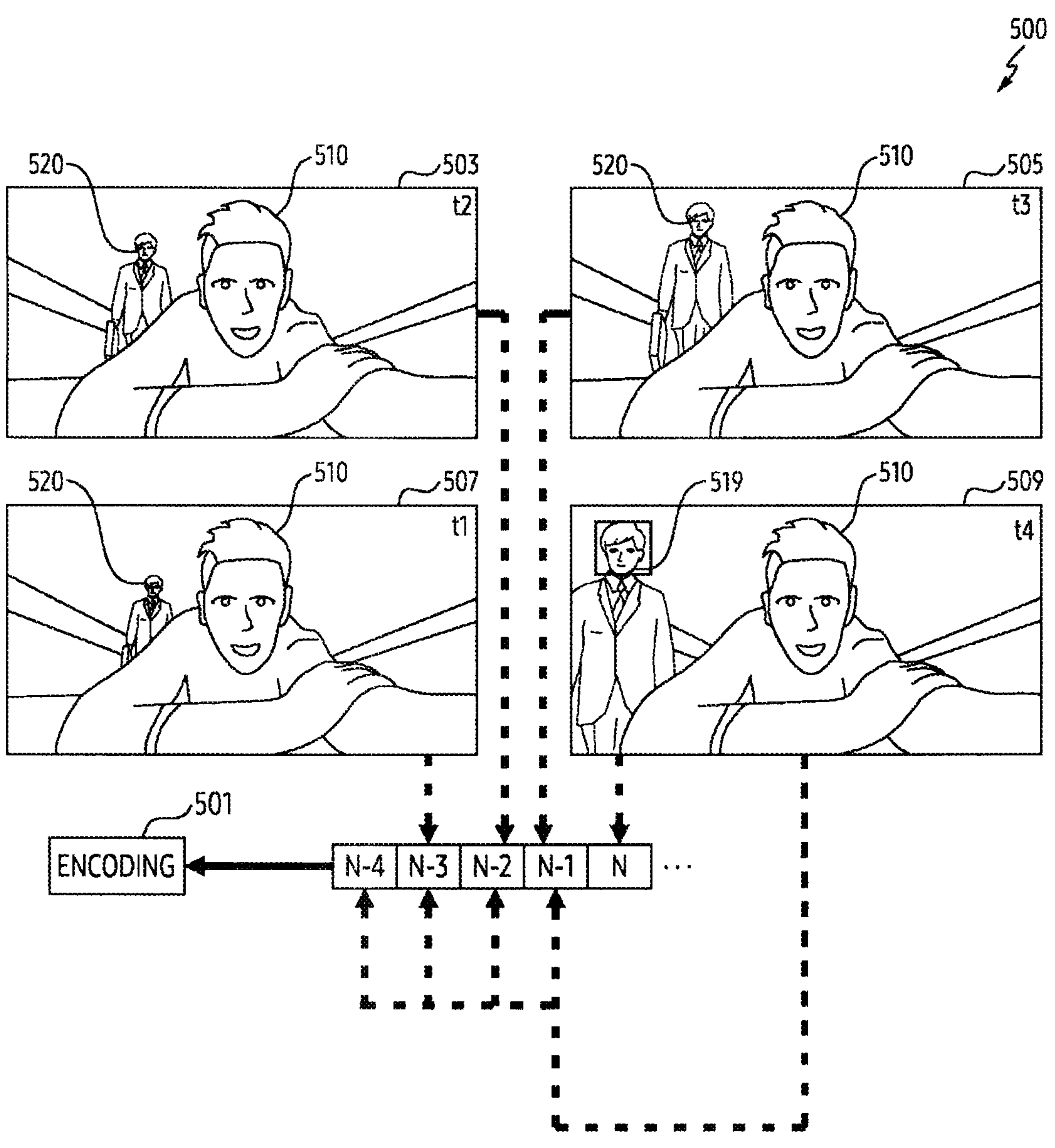
FIG. 5A illustrates an example of a buffer for masking, according to one or more embodiments.

FIG. 5A illustrates an example of a buffer for masking, according to one or more embodiments.

Referring to FIG. 5A, sequential images 500 illustrate images sequentially stored in a first storage device for the at least one processor to perform masking. The electronic device may obtain images in the order of a first image 507, a second image 503, a third image 505, and a fourth image 509. The order of the first image 507, the second image 503, the third image 505, and the fourth image 509 indicates that the main subject 510 in the center and the face of another person, which is a masking target, gradually approach the camera (e.g., the camera 230 in FIG. 2). Encoding 501 refers to an operation of encoding a masking review image based on a remaining capacity less than or equal to the designated reference capacity of the first storage device. The fourth image 509 refers to an image at a time point when the at least one processor detects a first visual object, which is a masking target. N (N is an integer), N-1, N-2, N-3, and N-4 refer to frame numbers, respectively. The face of another person in the fourth image 509 may be a first visual object 519. The first image 507, the second image 503, and the third image 505 may be masking review images.

The masking target detection module 251 (e.g., the masking target detection module 251 of FIG. 2) may identify a face of another person, which is a masking target, in the fourth image 509. The face of another person may be the first visual object. The video buffer management module 253 stores the first image 507, the second image 503, and the third image 505, which are images before the time point when the first visual object is identified. The first image 507, the second image 503, and the third image 505 are masking review images, and are images before the at least one processor encodes them. The local area fast search module 255 (e.g., the local area fast search module 255 of FIG. 2) may identify the second visual object 520 by searching a range in the masking review image corresponding to the position and size of the first visual object (e.g., the face of another person) in the image. The masking and metadata storage module 257 (e.g., masking and metadata storage module 257 of FIG. 2) may store data on the first visual object and the second visual object in the form of metadata. The masking and metadata storage module 257 may perform masking on each of the first visual object and the second visual object. The video encoder 259 (e.g., of FIG. 2) may encode (501) the masking review image based on the remaining capacity of the first storage device less than or equal to the designated reference capacity.

Figure 5B:
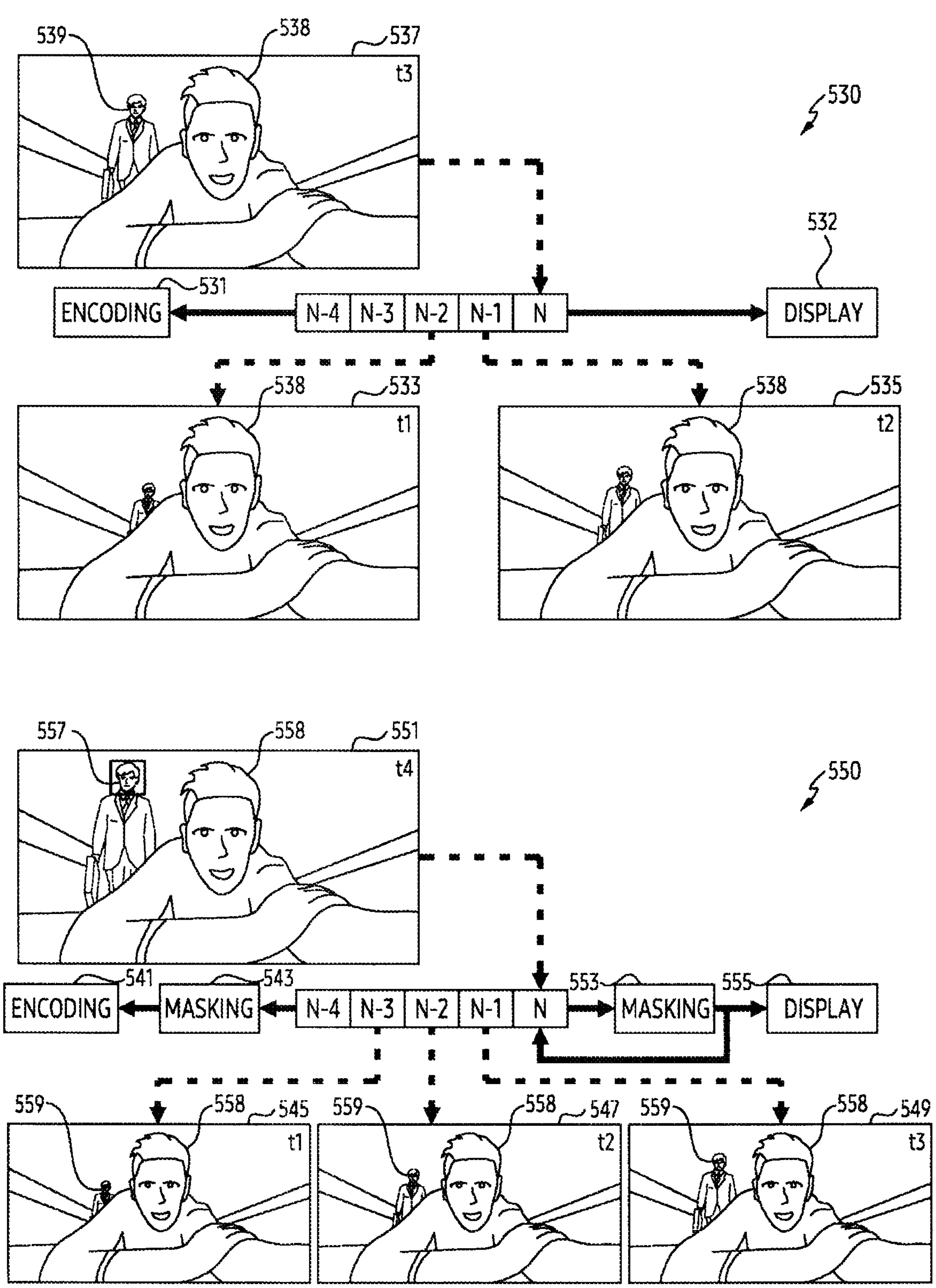
FIG. 5B illustrates an example of encoding an output image of a buffer for masking, according to one or more embodiments.

FIG. 5B illustrates an example of encoding an output image of a buffer for masking, according to one or more embodiments.

Referring to FIG. 5B, sequential images 530 illustrate a masking operation for images stored in a first storage device according to whether a first visual object is identified. The electronic device may obtain images in the order of a first image 533, a second image 535, and a third image 537. The order of the first image 533, the second image 535, and the third image 537 indicates that the main subject 538 in the center and the face of another person, which is a masking target, gradually approach the camera (e.g., the camera 230 of FIG. 2). The first image 533 and the second image 535 may indicate a masking review image stored in the first storage device. The third image 537 indicates an image obtained through a camera. Encoding 531 refers to an operation of encoding a masking review image based on a remaining capacity less than or equal to the designated reference capacity of the first storage device. N (N is an integer), N-1, N-2, N-3, and N-4 refer to frame numbers, respectively. If the first visual object 539, which is a masking target, is not detected in the third image 537, masking may not proceed, or even if masking proceeds, there may be no substantial change in the image before and after masking. In addition, the third image 537 may be stored in the first storage device and displayed by being transmitted to the display 532 (e.g., the display 290 of FIG. 2). Based on the remaining capacity below the designated reference capacity of the first storage device, the image stored in frame N-4 is sequentially encoded. The image of frame N-4 may be deleted or changed to another image after being encoded.

Sequential images 550 illustrate a masking operation for images stored in the first storage device according to whether the first visual object is identified. A first image 545, a second image 547, and a third image 549 may indicate a masking review image stored in the first storage device. A fourth image 551 indicates an image when at least one processor detects the first visual object 557 (e.g., the face of another person) that is a masking target. The electronic device may obtain images in the order of the first image 545, the second image 547, the third image 549, and the fourth image 551. The order of the first image 545, the second image 547, the third image 549, and the fourth image 551 indicates that the main subject 558 in the center and the face of another person, which is a masking target, gradually approach the camera (e.g., the camera 230 of FIG. 2). Encoding 541 refers to an operation of encoding a masking review image based on a remaining capacity less than or equal to the designated reference capacity of the first storage device. N (N is an integer), N-1, N-2, N-3, and N-4 refer to frame numbers. Masking 553 for the first visual object refers to an operation of performing masking on the first visual object of the image before displaying the image on the display 555 (e.g., the display 290 of FIG. 2). The masking 543 for the second visual object 559 refers to an operation of performing masking on the second visual object 559 of the masking review image before encoding 541. The display 555 indicates a result of masking performed on the image 551. According to one or more embodiments, when the first visual object 557 is detected in the image 551, the at least one processor displays an image obtained by masking the first visual object 557 of the image 551 on the display 555 after masking 553 for the first visual object. In addition, the at least one processor stores the masked image in the first storage device. According to one or more embodiments, when the first visual object 557 is detected in the image 551, the at least one processor may identify whether the second visual object 559 exists in each of the first image 545, the second image 547, and the third image 549, which are masking review images. When the second visual object 559 exists, masking 543 may be performed on the second visual object. The masking review image may be encoded 541 after the at least one processor performs masking 543 on the second visual object in the masking review image. In addition, data for the first visual object 557 and data for the second visual object 559 may be stored in the second storage device.

Figure 5C:
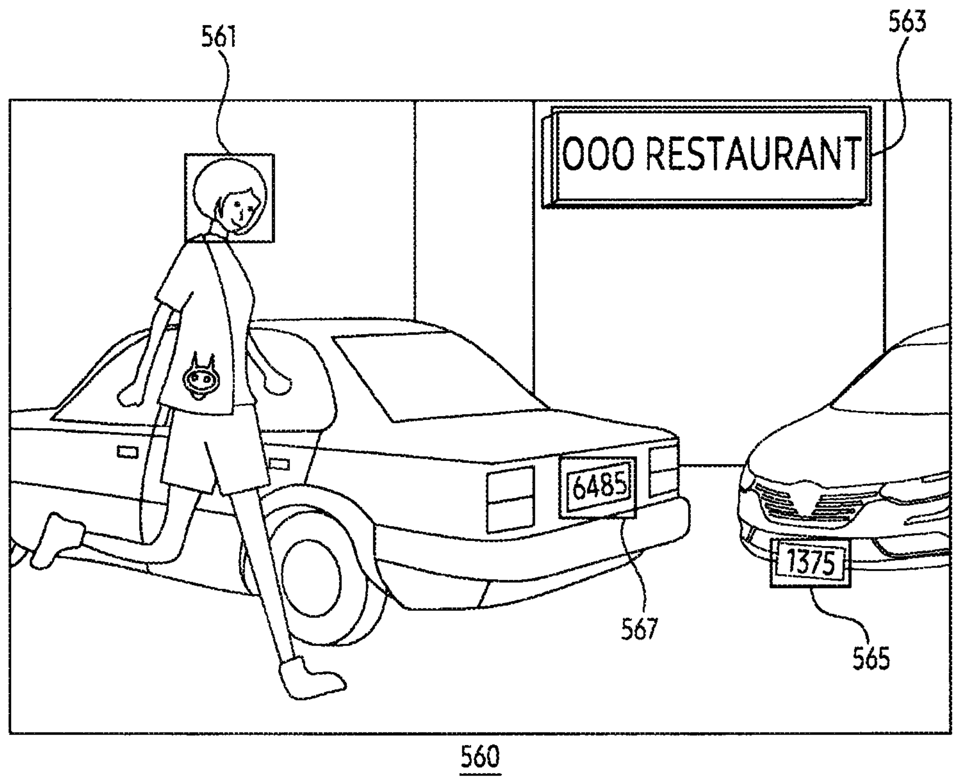
FIG. 5C illustrates an example of masking processing, according to one or more embodiments.
Figure 5C:
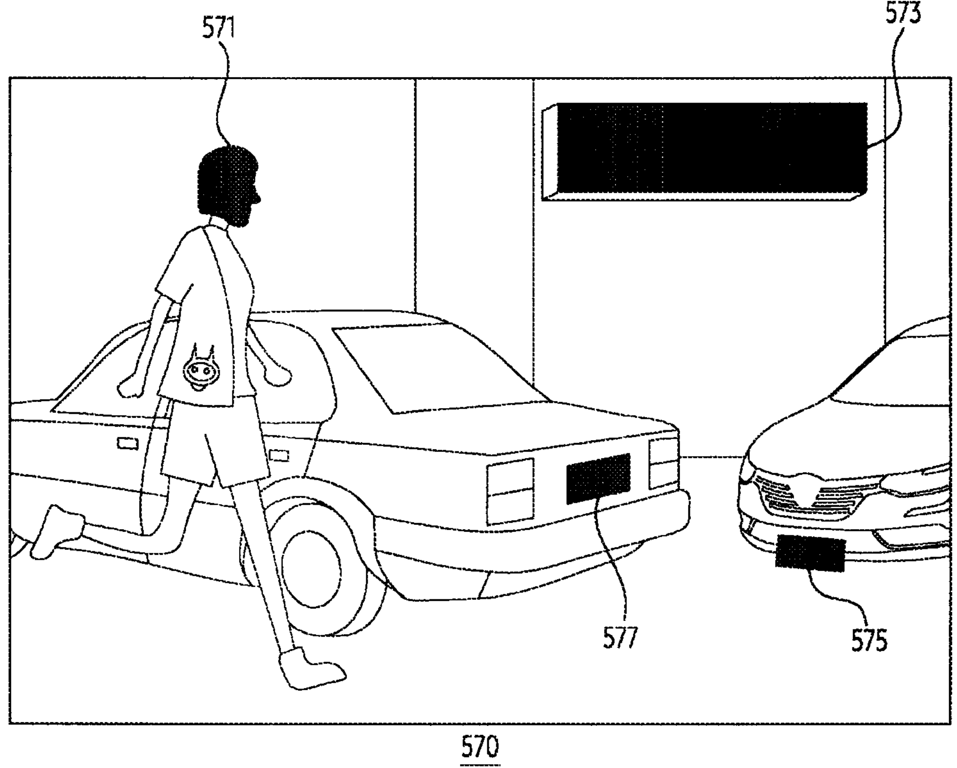

FIG. 5C illustrates an example of masking processing, according to one or more embodiments.

Referring to FIG. 5C, the first image 560 can contain a masking target candidate identified by a first operation before masking is performed. An object 561 of the first image 560 illustrates a human face. An object 563 of the first image 560 indicates a sign of a restaurant. An object 565 of the first image 560 indicates a license plate of the vehicle. The object 567 of the first image 560 indicates a vehicle license plate formed at a different angle.

According to an embodiment, the masking target detection module 251 is a module for identifying a masking target candidate using a first operation from an image obtained through a camera. The masking target candidate may be an object (e.g., human body, thing, and/or letter) capable of identifying one's own face or another person's face, a vehicle license plate, or a home address, or an object (e.g., thing, character, and/or encryption code) capable of identifying a phone number.

The masking target detection module 251 may identify one or more masking target candidates (e.g., the object 561, the object 563, the object 565, and/or the object 567). The first visual object that is a masking target among the one or more masking target candidates may be determined based on a user's input. The user can set the target to be masked before shooting or select it during shooting. The at least one processor may identify a first visual object from an image obtained later through a camera by extracting and learning features of a masking target designated by a user through the first operation (e.g., deep learning). According to one or more embodiments, when the user designates the restaurant sign as one of the masking targets before the video shoot, the masking target detection module 251 may identify the restaurant sign as a first visual object. As described above, the first operation may be an operation based on a neural network.

The second image 570 may include a masked object. The object 571 of the second image 570 indicates a masked person's face. The object 573 of the second image 570 indicates a masked a restaurant sign. The object 575 of the second image 570 indicates a license plate of a masked vehicle. The object 577 of the second image 570 indicates a masked license plate of the vehicle formed at a different angle. The masking area may be in the form of a simple figure including all or part of an object. For example, the masking area may be an irregular shape or a set of pixels like the object 571 of the second image 570. For example, the masking area may have a rectangular shape like the object 573 of the second image 570. For example, the masking area may have a trapezoidal shape like the object 575 of the second image 570 and the object 577 of the second image 570.

According to one or more embodiments, a recognition number (ID number) may be assigned to each external object corresponding to the first visual object. When changing the masking setting for an object of an image of a single frame, the masking setting for objects with the same recognition number in images of different frames may be changed together. The recognition number is included in data for the first visual object or data for the second visual object. For example, since the object 561 and the external object corresponding to the object 571 are substantially the same, the same recognition number (e.g., number 1) may be assigned. For example, since the object 563 and the external object corresponding to the object 573 are substantially the same, the same recognition number (e.g., number 2) may be assigned. For example, since the object 565 and the external object corresponding to the object 575 are substantially the same, the same recognition number (e.g., number 3) may be assigned. For example, since the object 567 and the external object corresponding to the object 577 are substantially the same, the same recognition number (e.g., number 4) may be assigned.

Figure 6:
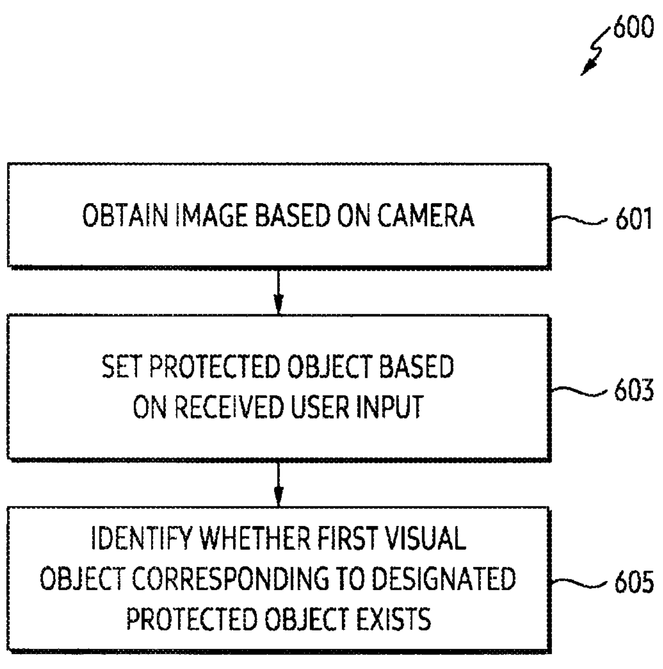
FIG. 6 is a flowchart illustrating an operation of an electronic device for identifying a first visual object based on a user input, according to one or more embodiments.

FIG. 6 is a flowchart illustrating an operation of an electronic device for identifying a first visual object based on a user input, according to one or more embodiments. Operations of the electronic device for identifying the first visual object based on the user input received in the preview will be described, through the operation flow 600 of FIG. 6.

In the following embodiment, each operation may be sequentially performed, but is not necessarily sequentially performed. For example, the order of each operation may be changed, and at least two operations may be performed in parallel.

According to an embodiment, operations 601 to 605 may be understood to be performed in a processor (e.g., the processor 210 of FIG. 2) of an electronic device (e.g., the electronic device 200 of FIG. 2).

Referring to FIG. 6, in operation 601, at least one processor may obtain an image based on a camera (e.g., the camera 230 of FIG. 2). According to one or more embodiments, the at least one processor may obtain an image based on the camera in the preview operation. In the preview operation, the image may be obtained based on the camera, but may not be stored in a memory. However, in the preview operation, the image may be temporarily stored in a display RAM in the display module.

In operation 603, the at least one processor may set a protected object (masking target) based on a received user input. According to one or more embodiments, the at least one processor may set a masking target for privacy protection among images obtained in the preview. For example, the user may select the trademark of the bag as a masking target for privacy protection within the image obtained in the preview. For example, the user may select another person's face as a masking target for privacy protection within the image obtained in the preview. For example, the user may exclude his or her face from the masking target in the image obtained in the preview. For example, the user may select an object or a type of object excluded from the masking target through a separate setting. For example, the user may exclude the face of the user or friend from the masking target. For example, the user may exclude all types of vehicle license plates from the masking target.

In operation 605, the at least one processor may identify whether there is a first visual object corresponding to a designated protected object (masking target) in the image. According to one or more embodiments, at least one processor may identify whether there is a first visual object corresponding to a masking target in the image.

Although operation flow 600 is illustrated as setting a masking target based on a user input received in operation 603, an embodiment of the disclosure may include setting a masking target based on an image. The electronic device according to one or more embodiments may further include a scene classification module recognizing a scene taken by a user. According to one or more embodiments, a masking target and a masking exclusion target may correspond to a specific scene. For example, when a part of the video is shot on the road, the scene classification module can identify a shooting location as a road, and a license plate of the vehicle may be set as a masking target in corresponding images. For example, when a part of the video is shot in a park, the scene classification module can identify the shooting location as a park and set a person's face as a masking target in corresponding images. For example, one or more masking targets may correspond to one scene classification.

Figure 7A:
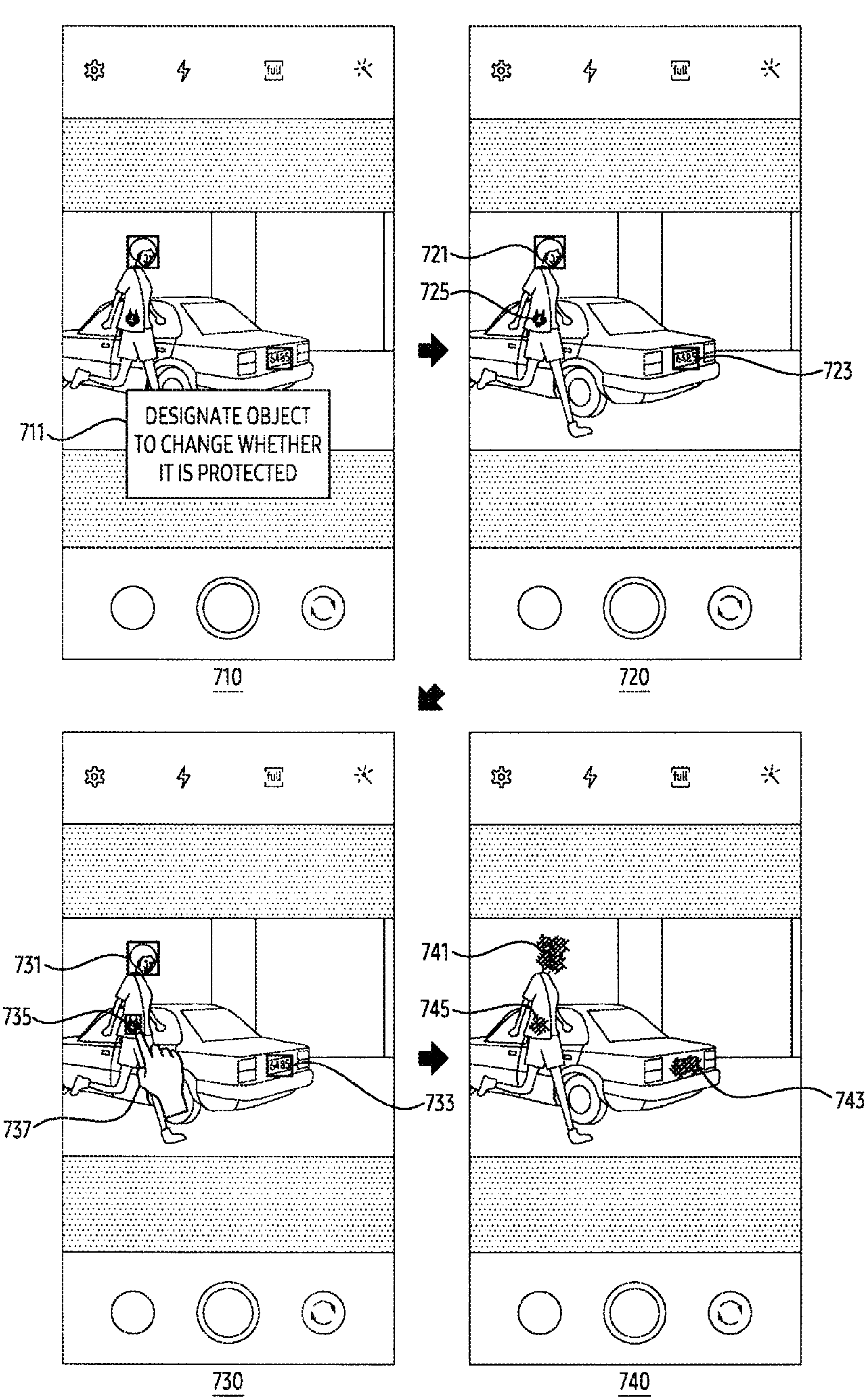
FIG. 7A illustrates an example of a protected object included in a masking target according to a user input, according to one or more embodiments.

FIG. 7A illustrates an example of a protected object included in a masking target according to a user input, according to one or more embodiments.

Referring to FIG. 7A, a first state 710, a second state 720, and a third state 730 may be previews. A fourth state 740 may be a state in which video shoot has started. In the first state 710, a user input for setting a masking target may be requested. A guide window 711 is a visual object for requesting a user input. In the second state 720, the identified masking target may be displayed, and a user input may be induced. An object 721 is a face of a person in an image. An object 723 is a license plate of a vehicle in the image. An object 725 is a trademark of the clothing in the image. The third state 730 indicates a state in which a user's input is received. An object 731 is the face of the person in the image. An object 733 is the license plate of the vehicle in the image. An object 735 is the trademark of the clothing in the image. A touch input 737 is a user's input (e.g., a finger touch input) for setting a masking target. The fourth state 740 indicates a state in which masking is performed based on a set masking target after the shooting starts. An object 741 is masking performed on the face of the person in the image. An object 743 is masking performed on the license plate of the vehicle in the image. An object 745 is masking performed on the t trademark of clothing in the image.

In the second state 720, the object 721 may correspond to a masking target. The object 723 may correspond to a masking target. The object 725 may correspond to a masking exclusion target.

In the third state 730, the object 731 may continue to correspond to a masking target. The object 733 may continue to correspond to a masking target. The object 735 may be changed from the masking exclusion target to a masking target by the touch input 737.

In the fourth state 740, masking may be performed based on the masking target included by the touch input 737 after the shoot starts.

Figure 7B:
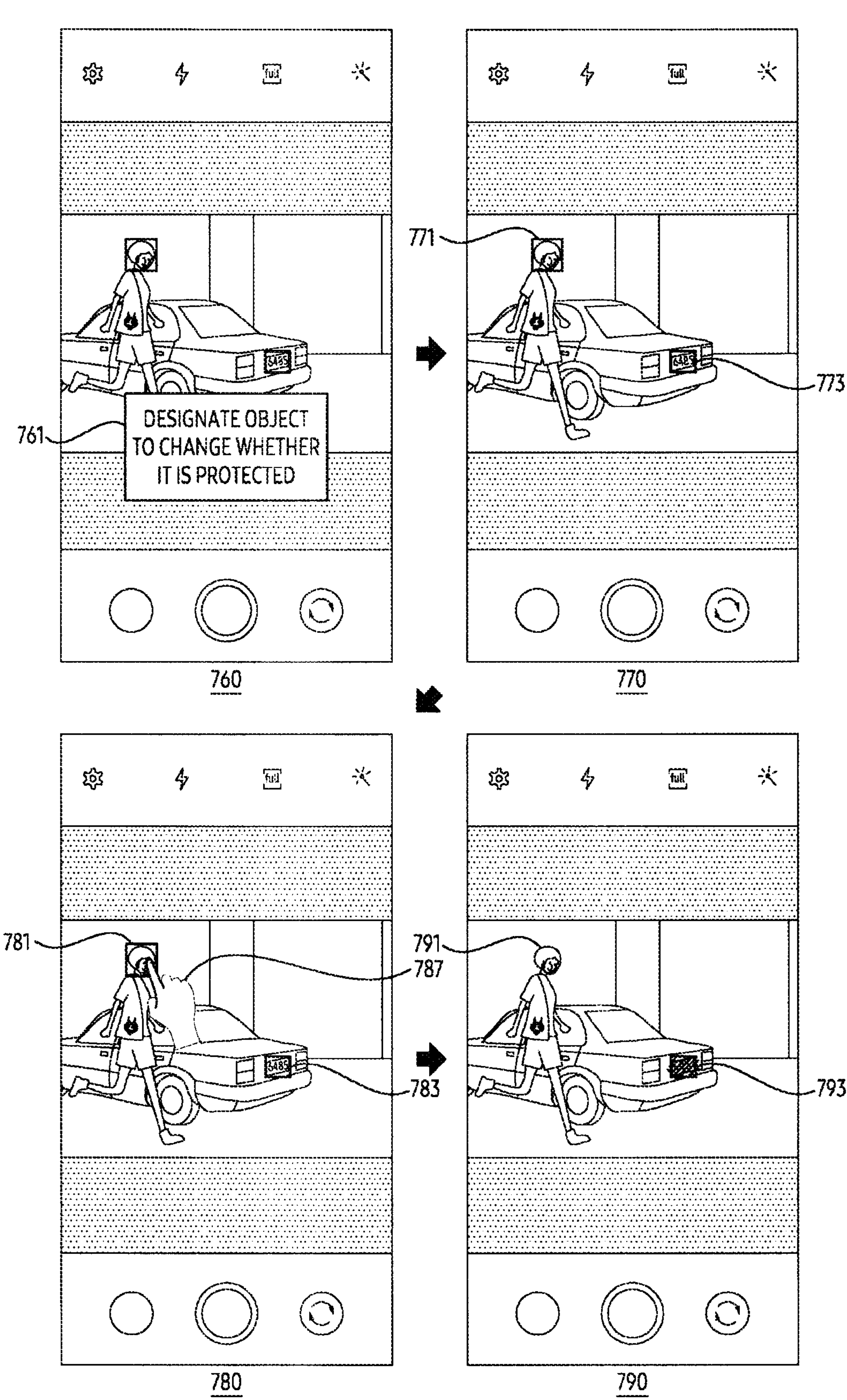
FIG. 7B illustrates an example of an object excluded from a masking target according to a user input, according to one or more embodiments.

FIG. 7B illustrates an example of an object excluded from a masking target according to a user input, according to one or more embodiments.

Referring to FIG. 7B, a first state 760, a second state 770 and a third state 780 may be previews. A fourth state 790 may be a state in which video shoot has started. In the first state 760, a state in which a user's input for setting a masking target is requested may be indicated. A guide window 761 may be a visual object for requesting user input. The second state 770 may be a state in which the identified masking target is displayed on the display and a user input is induced. An object 771 may be a face of a person in an image. An object 773 may be a license plate of a vehicle in the image. The third state 780 may be a state in which a user's input (e.g., a finger touch input) is received. An object 781 may be a face of a person in the image. An object 783 may be a license plate of a vehicle in the image. A touch input 787 may be a user input for excluding the object 781 from the masking target. The fourth state 790 may be a state in which masking is performed based on a set masking target after shooting starts. Since the object 791 is excluded from the masking target, masking may not be performed on the object 791. The object 793 may be masking performed on the license plate of the vehicle in the image.

In the second state 770, the object 771 may correspond to a masking target. The object 773 may correspond to a masking target.

In the third state 780, the object 781 may be excluded from the masking target by the touch input 787. The object 783 may continue to correspond to the masking target.

In the fourth state 790, masking may be performed based on the masking target excluded by the touch input 787 after shooting starts.

Figure 8A:
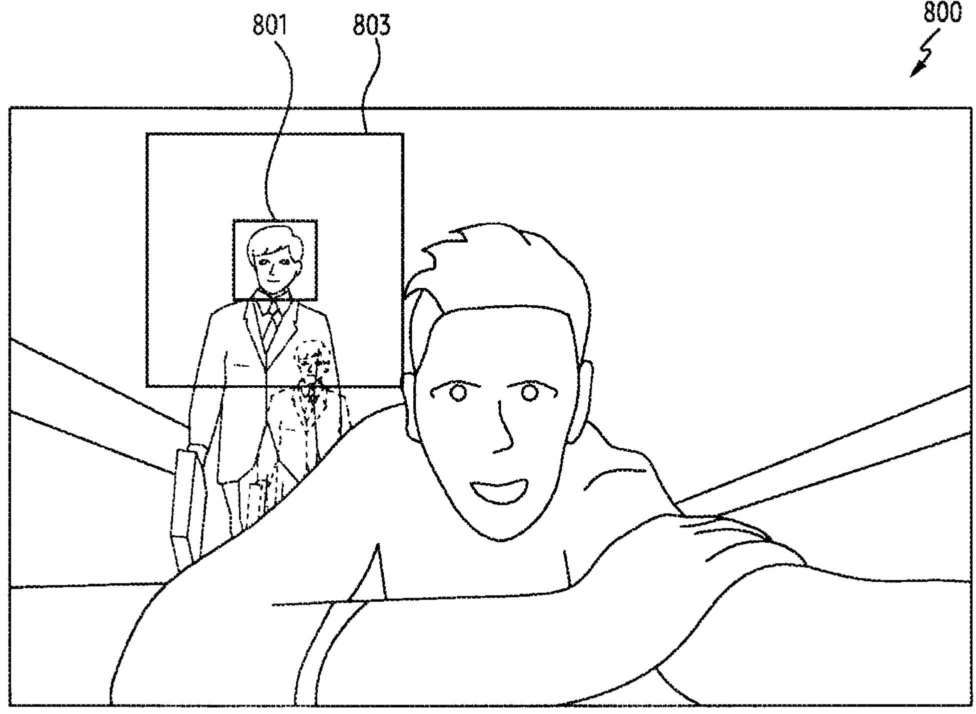
FIG. 8A illustrates an example of identification of a second visual object using a search area range, according to one or more embodiments.

FIG. 8A illustrates an example of identification of a second visual object using a search area range, according to one or more embodiments.

Referring to FIG. 8A, a masking review image 800 corresponds to a previous frame of an image obtained through the camera. The masking review image may be used to identify a search area range through a second operation. A range 801 corresponding to the first visual object may indicate a range for displaying the first visual object identified in an image obtained through the camera. A search area range 803 indicates a search area range for identifying the second visual object in the masking review image 800.

When the first visual object is identified in an image obtained through a camera (e.g., the camera 230 of FIG. 2), the at least one processor may set the search area range 803 for identifying the second visual object in the masking review image 800. According to one or more embodiments, the local area fast search module (e.g., the local area fast search module 255 of FIG. 2) may set the search area range 803 based on the position of the first visual object on the image. According to an embodiment, the search area range 803 may share a center point with the range 801 corresponding to the first visual object. The center point indicates a point located at the center of the designated area. The search area range 803 may be determined based on the range 801 corresponding to the first visual object. The search area range 803 may include the range 801 corresponding to the first visual object. The search area range 803 may be set so that the center point of the range 801 corresponding to the first visual object is located at the center point of the search area range 803. For example, the search area range 803 may be a rectangle sharing a central point with a rectangle of the range 801 corresponding to the first visual object and corresponding to about three times each of the horizontal and vertical lengths of the range 801 corresponding to the first visual object.

The local area fast search module 255 may identify whether there is a part having a characteristic similar to the first visual object in the search area range. A face of a person not identified as a first visual object in the masking review image 800 may be identified as a second visual object in the masking review image. This is because at least a part of the person's face corresponding to the first visual object is included in the search area range 803. The method of identifying the second visual object may be performed in the reverse order of shooting for all images stored in the first storage device until the second visual object is no longer detected.

Figure 8B:
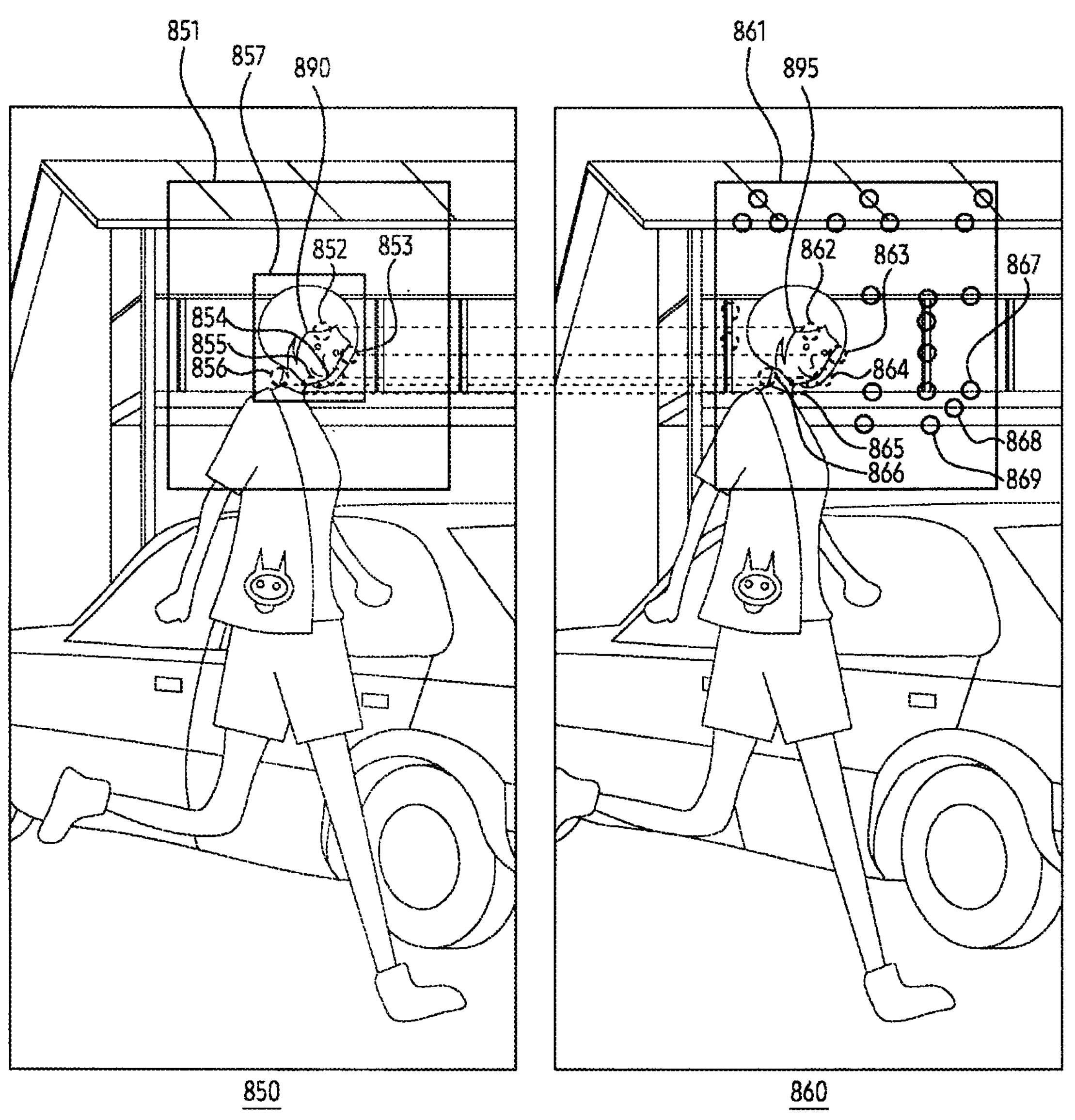
FIG. 8B illustrates an example of identification of a second visual object using a search area range and a key-point, according to one or more embodiments.

FIG. 8B illustrates an example of identification of a second visual object using a search area range and a keypoint, according to one or more embodiments.

Referring to FIG. 8B, the first image 850 may be an image from which the first visual object 890 is identified. The range 857 may be a range corresponding to the first visual object 890. A keypoint may be extracted from the first image 850. The keypoint refers to a position corresponding to the designated area in the image (e.g., corner of the image, edge of the image). A keypoint 852, a keypoint 853, a keypoint 854, a keypoint 855, and/or a keypoint 856 may indicate a keypoint extracted from the first visual object 890.

A search area range 851 may indicate a search area range set to identify the second visual object based on the first visual object 890. The second image 860 may be an image that precedes the first image 850 in time. In other words, a frame number of the second image 860 may be prior to a frame number of the first image 850. For example, a frame of the second image 860 may correspond to a frame just before the first image 850.

A search area range 861 may identify the second visual object 895. Among the keypoints extracted within the search area range 861 of the masking review image, a keypoint 862, a keypoint 863, a keypoint 864, a keypoint 865 and/or a keypoint 866 may correspond to the keypoints of the first visual object 890. Among the keypoints extracted within the search area range 861 of the masking review image, a keypoint 867, a keypoint 868, and/or a keypoint 869 may not correspond to the keypoint of the first visual object 890.

According to one or more embodiments, the local area fast search module 255 may identify the second visual object 895 based on a morphological characteristic rather than a semantic characteristic. For example, the at least one processor may identify whether the first visual object 890 and the masking review image are substantially the same by considering only the similarity of the keypoint between the first visual object 890 identified as a face and the masking review image, unlike the case where the at least one processor identifies whether it is a human face based on the common facial features through the masking target detection module 251 (e.g., the masking target detection module 251 of FIG. 2). When the second visual object 895 is identified by the second operation scheme, masking may be performed even when the user designates an object that is not trained by the natural network as a masking target.

According to one or more embodiments, at least one processor may set at least one search area range 861, based on the recognition number of the masking target, through the local area fast search module 255 using the second operation. Consumption of computing resources and temporal resources may be reduced by setting the search area range 861. According to an embodiment, the location and size of the search area range 861 may be determined based on the location and size of the first visual object 890. For example, the search area range 861 may be a rectangle sharing a central point with a rectangle indicating the first visual object 890 and corresponding to about three times each of the horizontal and vertical lengths of the range 857 corresponding to the first visual object 890.

According to one or more embodiments, the local area fast search module 255 may use keypoint extraction techniques such as scale invariant feature transform (SIFT), speeded up robust features (SURF), binary robust independent elementary features (BRIEF), and features from accelerated segment test (FAST) to extract the keypoints.

According to an embodiment, the at least one processor may identify a second visual object by reapplying a first operation to a masking review image that has been separately processed through the second operation (e.g., super resolution technique that maintains and magnifies the details of the image).

Figure 9A:
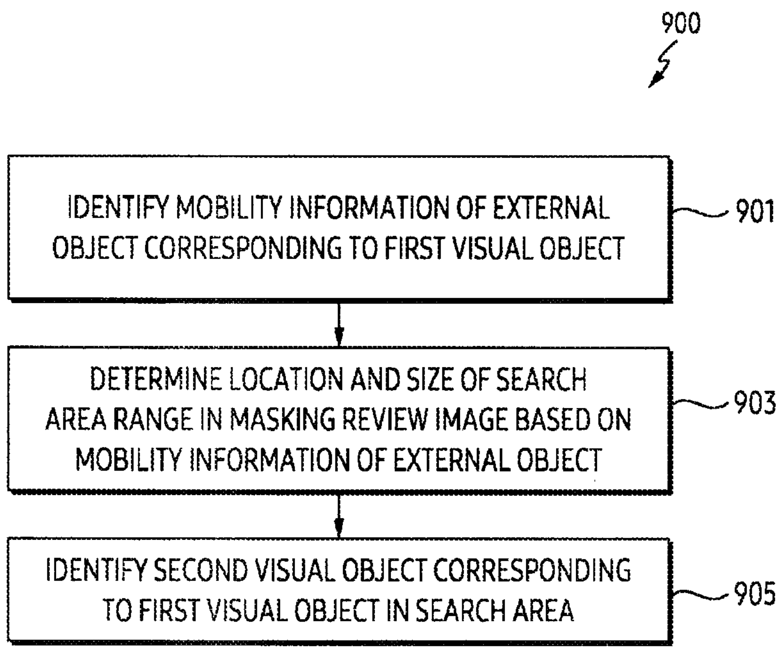
FIG. 9A is a flowchart illustrating an operation of an electronic device for performing a search based on mobility information of an external object, according to one or more embodiments.

FIG. 9A is a flowchart illustrating an operation of an electronic device for performing a search based on mobility information of an external object, according to one or more embodiments. Operations of the electronic device for identifying the second visual object in the masking review image will be described through the operation flow 900.

In the following embodiment, each operation may be sequentially performed, but is not necessarily sequentially performed. For example, the order of each operation may be changed, and at least two operations may be performed in parallel.

According to an embodiment, operations 901 to 905 may be understood to be performed in a processor (e.g., the processor 210 of FIG. 2) of an electronic device (e.g., the electronic device 200 of FIG. 2).

Referring to FIG. 9A, in operation 901, at least one processor may identify mobility information of an external object corresponding to the first visual object. According to one or more embodiments, at least one processor may identify mobility information for an external object corresponding to the first visual object of the image by comparing the image with the image of the previous frame. The mobility information may include a speed, movement direction, and the like at which the external object moves. For example, the first visual object may be the face of another person riding a bicycle. For example, the mobility information may include a speed, movement direction, and the like of another person riding the bicycle.

In operation 903, at least one processor may determine the location and size of the search area range in the masking review image based on the mobility information of the external object. According to one or more embodiments, the at least one processor may set a search area range according to the expected location of the second visual object based on the mobility information of the external object. For example, when the first visual object is the face of another person on a bicycle, a position in a masking review image may be expected based on the speed and movement direction of the other person on the bicycle. Thus, the at least one processor may set a search area range corresponding to the expected position.

In operation 905, the at least one processor may identify a second visual object corresponding to the first visual object within the search area. According to one or more embodiments, the at least one processor may identify whether the second visual object is included in the search area range based on a second operation. For example, the at least one processor may identify whether the object corresponding to the keypoint corresponds to the first visual object by extracting the keypoint of the masking review image within the search area range. When the object corresponding to the keypoint corresponds to the first visual object, the at least one processor may determine the object corresponding to the keypoint as a second visual object for masking.

Although FIG. 9A illustrates identifying the second visual object corresponding to the first visual object in the search area range, the embodiments of the disclosure are not limited thereto. Not performing masking because the second visual object is not identified within the search area range after determining the search area range may also be understood as an embodiment of the disclosure.

Figure 9B:
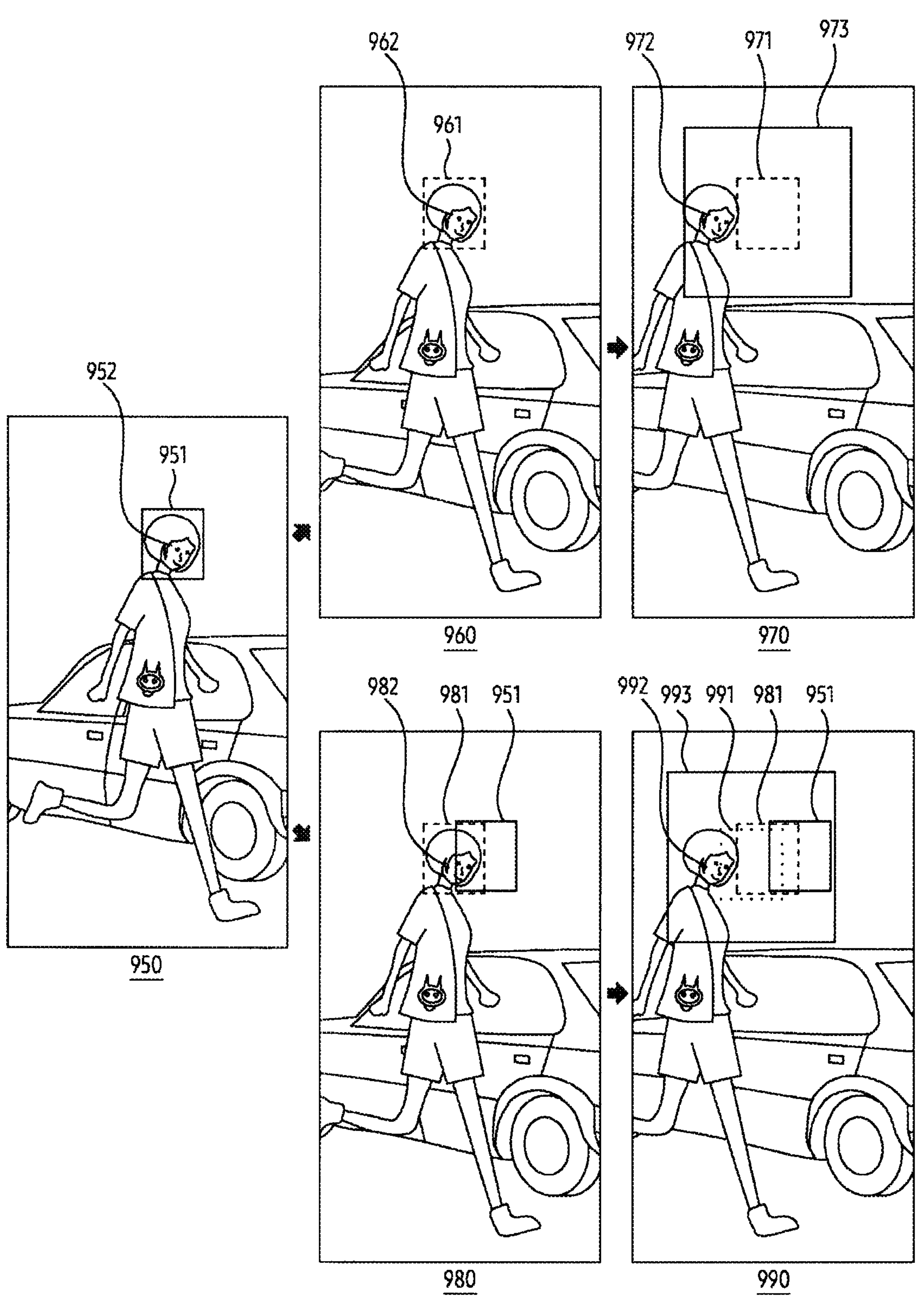
FIG. 9B illustrates an example of a search performed based on mobility information of an external object according to one or more embodiments.

FIG. 9B illustrates an example of a search performed based on mobility information of an external object according to one or more embodiments.

Referring to FIG. 9B, an image 950 may be an image from which a first visual object 952 is identified. A range 951 of the first visual object may be a range corresponding to the first visual object. An image 960 may be a masking review image in which the second visual object 962 is identified. A range 961 of the second visual object may be a range corresponding to the second visual object 962. An image 970 may be a masking review image for identifying a masking review image object. An expected range of the second visual object 971 may indicate an expected range of the second visual object 972 in the image 970. A search area range 973 may be an identification range set to efficiently identify the second visual object 972. The image 950, the image 960, and the image 970 may be images arranged in reverse order stored in the first storage device. Mobility information of an external object corresponding to the first visual object 952 in the image 960 may not be considered. In image 970, the search area range 973 may be determined without considering mobility information of an external object corresponding to the first visual object 952. In the image 970, the expected range of the second visual object 971 may be substantially the same position as the range 961 of the second visual object.

An image 980 may be a masking review image in which a second visual object 982 is identified to obtain mobility information of an external object. A range 981 of the second visual object may be a range corresponding to the second visual object 982. An image 990 may be a masking review image for identifying a second visual object 992. The expected range of the second visual object 991 may indicate an expected range of the second visual object 992 in the image 990. A search area range 993 may be an identification range set to accurately identify the second visual object 992 in a relatively short time. The image 950, the image 980, and the image 990 may be images arranged in reverse order stored in the first storage device.

Mobility information of an external object corresponding to the first visual object 952 may be obtained in the image 980. For example, the mobility information may be obtained based on the difference between the range 951 of the first visual object and the range 981 of the second visual object. In image 990, the search area range 993 may be determined in consideration of mobility information of an external object corresponding to the first visual object 952. The expected range of the second visual object 991 may be determined in consideration of mobility information of the external object. For example, when the time interval between the image 950, the image 980 and the image 990 is the same, the expected range of the second visual object 991 may be an area moved by a difference between the range 951 of the first visual object and the range 981 of the second visual object, in a direction opposite to the movement direction of the external object in the range 981 of the second visual object.

When comparing the search area range 973 determined without consideration of the mobility information of the external object and the search area range 993 determined in consideration of the mobility information of the external object, it can be confirmed that the second visual object 992 in the case of considering the mobility information is included close to the center of the range. As the speed of the external object increases, the error of search area range 993 when considering the mobility information of the external object may decrease compared to the error of search area range 973 when mobility information is not considered.

In FIG. 9B, the size of the search area ranges (973 and 993) is illustrated as being constant, but the embodiments of this disclosure are not limited thereto. According to one or more embodiments, the size of the search area ranges 973 and 993 may be determined based on the size of the second visual objects 972 and 992. According to one or more embodiments, the size of the search area range 993 may be determined based on mobility information of the external object. For example, as the speed of the external object increases, the size of the search area range 993 may be set wider. According to embodiments, the search area range may correspond to the entire video.

Figure 10:
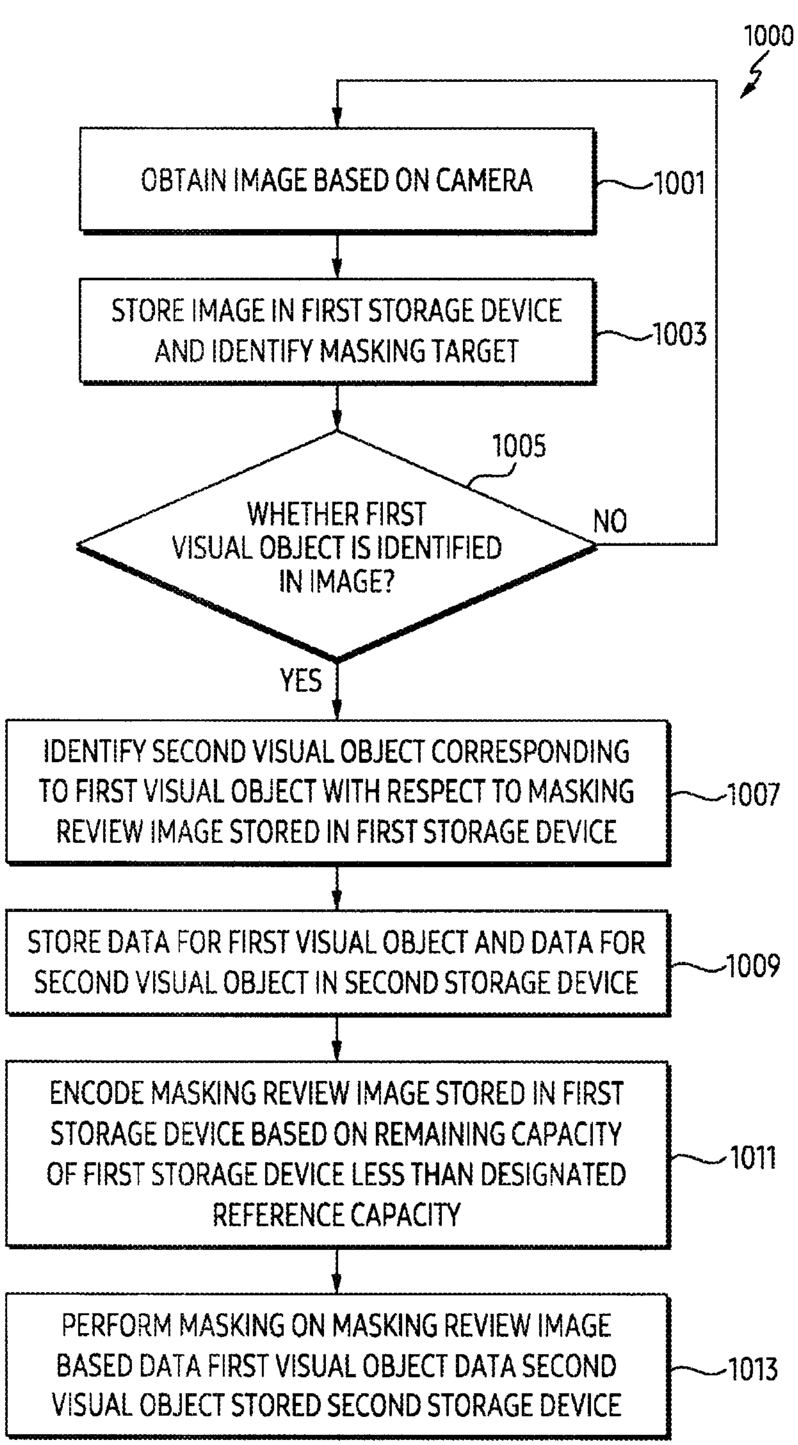
FIG. 10 is a flowchart illustrating an operation of an electronic device for performing post-encoding masking, according to one or more embodiments.

FIG. 10 is a flowchart illustrating an operation of an electronic device for performing post-encoding masking, according to one or more embodiments. Unlike FIG. 4, masking may be performed after encoding and storing video. Operation 1001 to operation 1009 may correspond to operation 401 to operation 409 of FIG. 4.

In the following embodiment, each operation may be sequentially performed, but is not necessarily sequentially performed. For example, the order of each operation may be changed, and at least two operations may be performed in parallel.

According to an embodiment, operations 1001 to 1013 may be understood to be performed in a processor (e.g., the processor 210 of FIG. 2) of an electronic device (e.g., the electronic device 200 of FIG. 2).

Referring to FIG. 10, the operation flow 1000 illustrates an operation flow of an electronic device for performing masking after encoding a stored video by a user using a privacy masking application.

In operation 1001, at least one processor may obtain images based on the camera.

In operation 1003, the at least one processor may store an image in a first storage device and identify a masking target. The first storage device may be a buffer for storing images configuring video before encoding. The at least one processor may identify the masking target through the first operation.

In operation 1005, the at least one processor may determine whether the first visual object is identified in the image. When the first visual object is identified, the at least one processor may perform operation 1007. When the first visual object is not identified, the at least one processor may perform operation 1001.

In operation 1007, the at least one processor may identify a second visual object corresponding to the first visual object with respect to the masking review image stored in the first storage device.

In operation 1009, the at least one processor may store data for the first visual object and data for the second visual object in the second storage device. According to one or more embodiments, the data for the first visual object and the data for the second visual object may refer to metadata.

In operation 1011, the at least one processor may encode the masking review image stored in the first storage device based on the remaining capacity of the first storage device less than the designated reference capacity. According to one or more embodiments, when the remaining capacity of the first storage device is less than or equal to the designated reference capacity, the masking review image in the first storage device may be encoded. The first storage device having a designated capacity may delete the masking review image for which encoding has been performed. Although an embodiment using the remaining capacity is described in FIG. 11, storage capacity may be used instead of the remaining capacity.

In operation 1013, the at least one processor may perform masking on the masking review image based on the data for the first visual object and the data for the second visual object stored in the second storage device. The masking review image may be encoded.

Although the operation flow 1000 is illustrated as encoding a masking review image after data on the first visual object and data on the second visual object stored in the second storage device are stored, but embodiments of the disclosure are not limited thereto. Operation 1003, operation 1005, operation 1007, and operation 1009 may be performed again by designating an object in the encoded image as a masking target after operation 1011.

Figure 11:
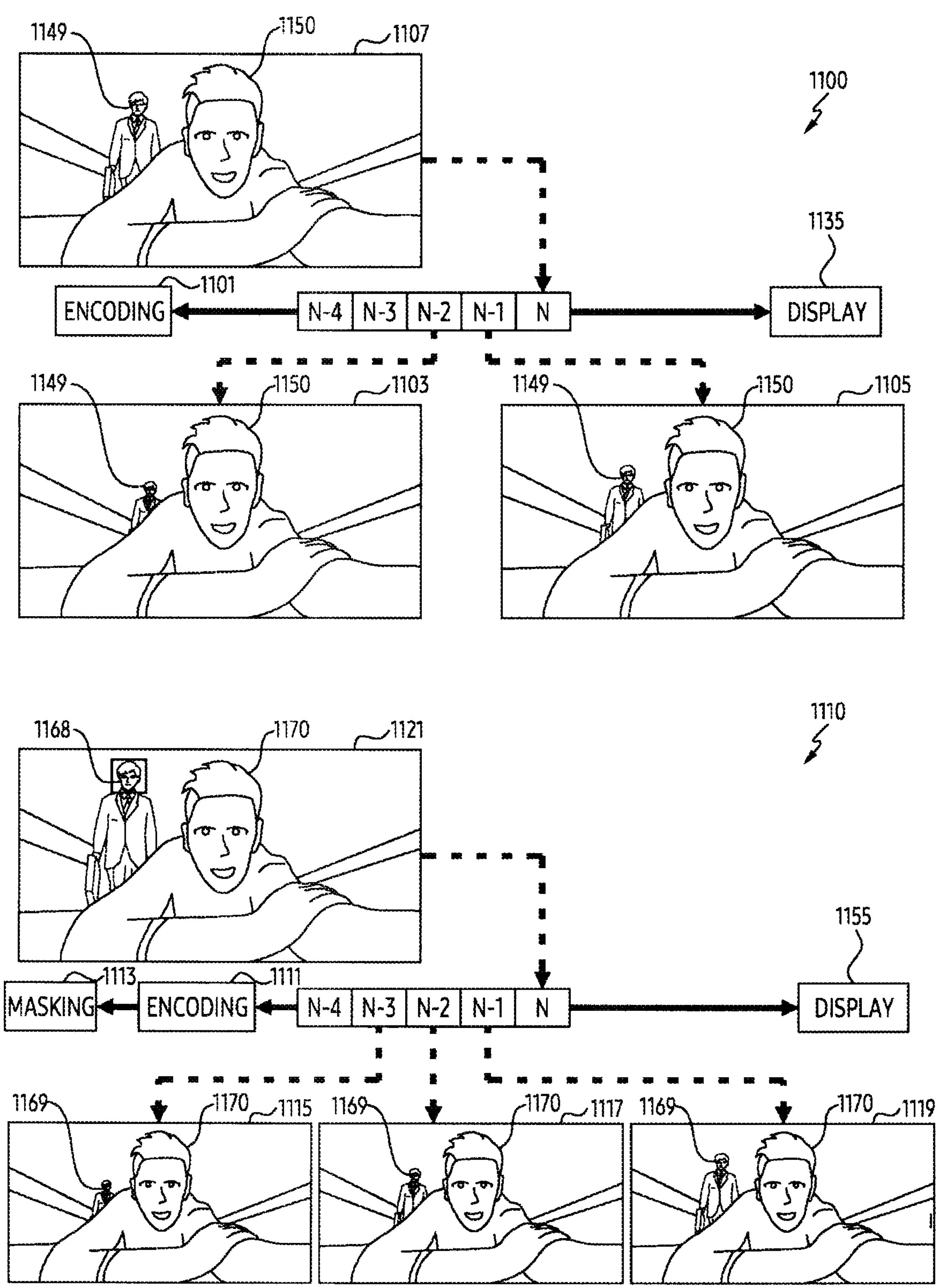
FIG. 11 illustrates an example of stored images to perform post-encoding masking, according to one or more embodiments.

FIG. 11 illustrates an example of stored images to perform post-encoding masking, according to one or more embodiments. Referring to FIG. 11, sequential images 1100 may include a first image 1103, a second image 1105, and a third image 1107. The first image 1103 and the second image 1105 may indicate a masking review image stored in the first storage device. The third image 1107 indicates an image obtained through a camera. The electronic device may obtain images in the order of the first image 1103, the second image 1105, and the third image 1107. The order of the first image 1103, the second image 1105, and the third image 1107 indicates that the main subject 1150 in the center and the face of another person, which is a masking target 1149, gradually approach the camera (e.g., the camera 230 of FIG. 2). Encoding 1101 indicates an operation of encoding a masking review image based on a remaining capacity less than or equal to the designated reference capacity of the first storage device. N (N is an integer), N-1, N-2, N-3, and N-4 refer to frame numbers. When the first visual object, which is the masking target 1149, is not detected in the third image 1107, information on the first visual object may not be stored in the second storage device. In addition, the third image

1107 may be stored and displayed in the first storage device by being transmitted to the display 1135 (e.g., the display 290 of FIG. 2). The image of frame N-4 may be deleted or changed to another image after being encoded.

Sequential images 1110 may include a first image 1115, a second image 1117, a third image 1119, and a fourth image 1121. The first image 1115, the second image 1117, and the third image 1119 may indicate a masking review image stored in the first storage device. In the fourth image 1121, at least one processor may detect a first visual object (e.g., a face of another person) that is a masking target. The electronic device may obtain images in the order of the first image 1115, the second image 1117, the third image 1119, and the fourth image 1121. The order of the first image 1115, the second image 1117, the third image 1119, and the fourth image 1121 indicates that the main subject 1170 in the center and the face of another person, which is a masking target, gradually approach the camera (e.g., the camera 230 of FIG. 2). Encoding 1101 indicates an operation of encoding a masking review image based on a remaining capacity less than or equal to the designated reference capacity of the first storage device. Masking 1113 may be an operation of processing a visual object included in the encoded second visual images so that others cannot identify it for privacy protection. N (N is an integer), N-1, N-2, N-3, and N-4 refer to frame numbers. The masking 1113 for the second visual object 1169 may be performed for the first visual object and the second visual object included in the encoded masking review image. The display 1155 (e.g., the display 290 of FIG. 2) may display the image 1121. According to one or more embodiments, when the first visual object 1168 is detected in the fourth image 1121, the at least one processor may display the image 1121 on the display without masking the first visual object 1168. However, embodiments of the disclosure are not limited thereto. For example, the at least one processor may perform masking on the first visual object 1168 and display an image 1121 on a display. According to one or more embodiments, when the first visual object 1168 is detected in the fourth image 1121, the at least one processor may identify whether the second visual object 1169 exists in the first image 1115, the second image 1117, and the third image 1119, which are masking review images. When the second visual object 1169 exists, data on the second visual object may be stored in the second storage device. Masking 1113 may be performed on the first visual object 1168 and the second visual object 1169 in the masking review image based on a user input after the masking review image is encoded 1111. For example, the masking 1113 may be performed based on a user input for masking another person's face.

According to one or more embodiments, since the data for the first visual object 1168 and the data for the second visual object 1169 are included in the video information related to the images 1110 even in an image in which masking 1113 is not performed, consumption of temporal resources may be reduced when masking 1113 is performed after encoding.

Figure 12:
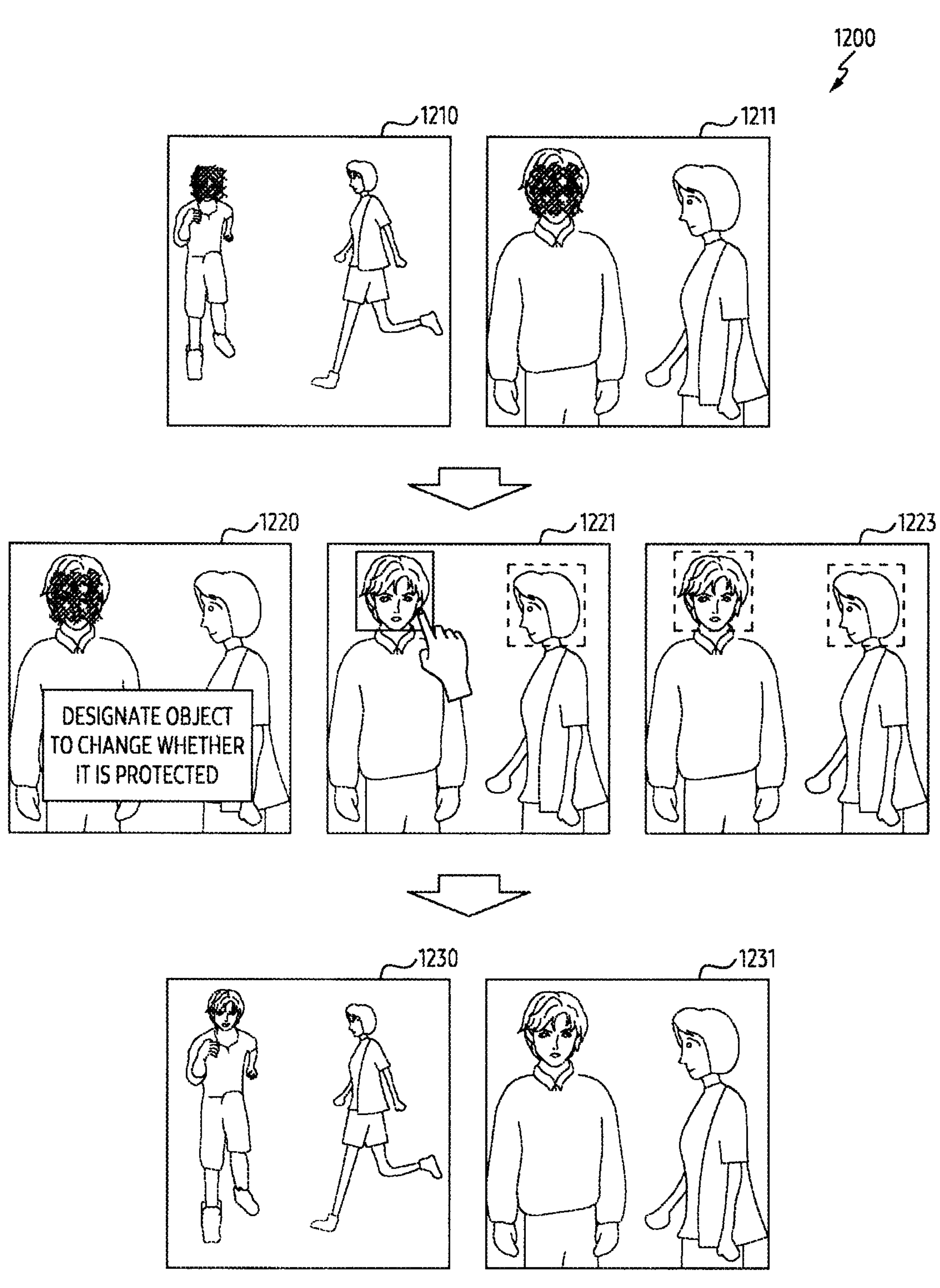
FIG. 12 illustrates an example of releasing masking after masking according to one or more embodiments.

FIG. 12 illustrates an example of releasing masking after masking according to one or more embodiments.

Referring to FIG. 12, according to one or more embodiments, sequential image 1200 illustrates an example of masking cancellation corresponding to a change from a masking target to a masking exclusion target after masking. The first image 1210 and the second image 1211 are images in which masking of contents of interviewing another is performed. The third image 1220 indicates a state in which a user input (e.g., a finger touch input) is requested to change a masking target. The fourth image 1221 indicates a state in which the user input is received for changing a masking target. The fifth image 1223 indicates a state in which the masking target is changed based on the user input. The sixth image 1230 and the seventh image 1231 indicate a state in which masking of the content of interviewing another person is released.

Since the face of another person is a masking target in the first image 1210 and the second image 1211, masking may be performed. However, the user may want to release masking when interviewing others. Since the images configuring the stored video include data on the visual object, at least one processor may release or add masking based on the data on the visual object. Like the third image 1220, the at least one processor may request a user's input to change the masking target and induce a user's input. In the fourth image 1221, the at least one processor may exclude another person's face from the masking target based on a touch input for another person's face corresponding to the masking target. In the fifth image 1223, the face of another person is excluded from the masking target. In the sixth image 1230 and the seventh image 1231, masking may be released on the face of another person.

As described above, according to one or more embodiments, an electronic device may comprise at least one processor, at least one camera, and a first storage device and a second storage device for the at least one camera. The at least one processor may be configured to identify a first visual object in image obtained through the at least one camera. The at least one processor may be configured to store the image in the first storage device. The at least one processor may be configured to, after identifying the first visual object, identify a second visual object corresponding to the first visual object in a masking review image stored in the first storage device before storing the image. The at least one processor may be configured to perform a masking on the image based on data for the first visual object stored in the second storage device. The at least one processor may be configured to perform a masking on the masking review image based on data for the second visual object stored in the second storage device. The at least one processor may be configured to encode the masking review image stored in the first storage device based on a remaining capacity of the first storage device smaller than a designated reference capacity.

According to an embodiment, the at least one processor may be configured to receive a user input for setting a protected object in the image to identify the first visual object. The at least one processor may be further configured to perform a protection procedure to cancel the masking on the protected object from each of images stored in the first storage device.

According to an embodiment, the first visual object may be identified based on a neural network.

According to an embodiment, the at least one processor may be configured to determine a search area range in the masking review image based on a location of the first visual object in the image in order to identify the second visual object corresponding to the first visual object in the masking review image. The at least one processor may be configured to identify the second visual object in the determined search area range in the masking review image.

According to an embodiment, the at least one processor may be configured to determine a size of a search area in the masking review image based on mobility information of an external object corresponding to the first visual object in order to identify the second visual object.

According to an embodiment, the at least one processor may be configured to identify the second visual object in the determined search area range in the masking review image.

According to an embodiment, the at least one processor may be configured to determine a location of a search area range in the masking review image based on mobility information of an external object corresponding to the first visual object in order to identify the second visual object. The at least one processor may be configured to identify the second visual object in the determined search area range in the masking review image.

According to an embodiment, each of images stored in the first storage device may be an I (intra) frame.

As described above, according to one or more embodiments, an electronic device may comprise at least one processor, at least one camera, and a first storage device and a second storage device for the at least one camera. The at least one processor may be configured to identify a first visual object in an image obtained through the at least one camera. The at least one processor may be configured to store the image in the first storage device. The at least one processor may be configured to, after identifying the first visual object, identify a second visual object corresponding to the first visual object in a masking review image stored in the first storage device before storing the image. The at least one processor may be configured to store data for the first visual object in the image and data for the second visual object in the masking review image in the second storage device. The at least one processor may be configured to encode the masking review image stored in the first storage device based on a remaining capacity of the first storage device smaller than a designated reference capacity. The at least one processor may be configured to perform a masking on the masking review image encoded based on data for the first visual object in the image and data for the second visual object in the masking review image.

According to an embodiment, the at least one processor may be configured to receive a user input for setting a protected object in the image in order to identify the first visual object. According to an embodiment, the at least one processor may be further configured to perform protection procedure to cancel the masking on the protected object from each of images stored in the first storage device.

According to an embodiment, the first visual object may be identified based on a neural network.

According to an embodiment, the at least one processor may be configured to determine a search area range in the masking review image based on a location of the first visual object in the image in order to identify the second visual object corresponding to the first visual object in the masking review image. The at least one processor may be configured to identify the second visual object in the determined search area range in the masking review image.

According to an embodiment, the at least one processor may be configured to determine a size of a search area in the masking review image based on mobility information of an external object corresponding to the first visual object in order to identify the second visual object. The at least one processor may be configured to identify the second visual object in the determined search area range in the masking review image.

According to an embodiment, the at least one processor may be configured to determine a location of a search area range in the masking review image based on mobility information of an external object corresponding to the first visual object in order to identify the second visual object. The at least one processor may be configured to identify the second visual object in the determined search area range in the masking review image.

According to an embodiment, each of images stored in the first storage device may be an I (intra) frame.

As described above, according to one or more embodiments, in a computer readable storage medium storing one or more programs, the one or more programs may comprise instructions which, when executed by a processor of an electronic device, cause the electronic device to identify a first visual object in an image obtained through a at least one camera. The one or more programs may be configured to store the image in a first storage device. The one or more programs may be configured to, after identifying the first visual object, identify a second visual object corresponding to the first visual object in a masking review image stored in the first storage device before storing the image. The one or more programs may be configured to perform a masking on the image based on data for the first visual object stored in second storage device. The one or more programs may be configured to perform a masking on the masking review image based on data for the second visual object stored in the second storage device. The one or more programs may comprise instructions causing the electronic device to encode the masking review image stored in the first storage device based on a remaining capacity of the first storage device smaller than a designated reference capacity.

According to an embodiment, the one or more of the programs may include instructions causing the electronic device to receive user input for setting a protected object in the image. The one or more of the programs may further include instructions causing the electronic device to perform a protection procedure to cancel the masking on the protected object from each of images stored in the first storage device.

According to an embodiment, the first visual object may be identified based on a neural network.

According to an embodiment, the one or more programs may include instructions causing the electronic device to determine a search area range in the masking review image based on a location of the first visual object in the image in order to identify the second visual object corresponding to the first visual object in the masking review image. The one or more programs may include instructions causing the electronic device to identify the second visual object in the determined the search area range in the masking review image.

According to an embodiment, the one or more programs may include instructions causing the electronic device to determine a size of a search area in the masking review image based on mobility information of an external object corresponding to the first visual object in order to identify the second visual object. The one or more programs may include instructions causing the electronic device to identify the second visual object in the determined search area range in the masking review image.

According to an embodiment, the one or more programs may include instructions causing the electronic device to determine a location of a search area range in the masking review image based on mobility information of an external object corresponding to the first visual object in order to identify the second visual object. The one or more programs may include instructions causing the electronic device to identify the second visual object in the determined search area range in the masking review image.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a camera;

memory; and at least one processor comprising processing circuitry, and wherein the at least one processor is configured to:

based on an input for generating a video, obtain, via the camera, image frames including a first image frame, a second image frame, and a third image frame, wherein the second image frame is obtained prior to the first image frame, and wherein the third image frame is obtained prior to the second image frame;

identify a visual object to which an image masking is to be applied in the first image frame;

based on identifying the visual object in a portion of the first image frame:

apply the image masking to the first image frame, and identify the visual object in the second image frame;

based on identifying the visual object in a portion of the second image frame:

apply the image masking to the second image frame, and identify a positional difference, for determining a search area to be used for identifying the visual object included in the third image frame, between the portion of the first image frame and the portion of the second image frame;

determine a movement direction of the visual object based on the positional difference;

in accordance with the movement direction of the visual object, determine a center point for the search area, wherein the center point for the search area is spaced apart from a center point of the portion of the second image frame by the positional difference in a direction opposite to the movement direction;

determine the search area using the center point for the search area determined based on the movement direction of the visual object;

identify whether the visual object is included in the search area of the third image frame;

based on identifying that the visual object is included in the search area of the third image frame, apply the image masking to the third image frame;

based on identifying that the visual object is not included in the search area of the third image frame, search for the visual object in a remaining area different from the search area in the third image frame; and generate the video including the image frames.

2. The electronic device of claim 1, wherein the at least one processor is further configured to:

identify a user input for releasing the image masking with respect to the generated video; and based on the user input, perform an operation of releasing the image masking with respect to the generated video.

3. The electronic device of claim 1, wherein the visual object to which the image masking is to be applied is identified based on an operation of a neural network.

4. The electronic device of claim 1, wherein the at least one processor is further configured to:

based on the positional difference between the portion of the first image frame and the portion of the second image frame, determine a speed of the visual object; and determine a size of the search area in accordance with the speed of the visual object, and wherein the size of the search area increases as the speed of the visual object increases.

5. The electronic device of claim 1, wherein the image frames correspond to intra (I) frames.

6. A non-transitory computer readable storage medium storing one or more programs, the one or more programs comprising instructions to, when executed by an electronic device with a camera, cause the electronic device to:

based on an input for generating a video, obtain, via the camera, image frames including a first image frame, a second image frame, and a third image frame, wherein the second image frame is obtained prior to the first image frame, and wherein the third image frame is obtained prior to the second image frame;

identify a visual object to which an image masking is to be applied in the first image frame;

based on identifying the visual object in a portion of the first image frame:

apply the image masking to the first image frame, and identify the visual object in the second image frame;

based on identifying the visual object in a portion of the second image frame:

apply the image masking to the second image frame, and identify a positional difference, for determining a search area to be used for identifying the visual object included in the third image frame, between the portion of the first image frame and the portion of the second image frame;

determine a movement direction of the visual object based on the positional difference;

in accordance with the movement direction of the visual object, determine a center point for the search area, wherein the center point for the search area is spaced apart from a center point of the portion of the second image frame by the positional difference in a direction opposite to the movement direction;

determine the search area using the center point for the search area determined based on the movement direction of the visual object;

identify whether the visual object is included in the search area of the third image frame;

based on identifying that the visual object is included in the search area of the third image frame, apply the image masking to the third image frame;

based on identifying that the visual object is not included in the search area of the third image frame, search for the visual object in a remaining area different from the search area in the third image frame; and generate the video including the image frames.

7. The non-transitory computer readable storage medium of claim 6, wherein the one or more programs comprise the instructions further causing the electronic device to:

identify a user input for releasing the image masking with respect to the generated video; and based on the user input, perform an operation of releasing the image masking with respect to the generated video.

8. The non-transitory computer readable storage medium of claim 6, wherein the visual object to which the image masking is to be applied is identified based on an operation of a neural network.

9. The non-transitory computer readable storage medium of claim 6, wherein the one or more programs comprise the instructions further causing the electronic device to:

based on the positional difference between the portion of the first image frame and the portion of the second image frame, determine a speed of the visual object; and determine a size of the search area in accordance with the speed of the visual object, and wherein the size of the search area increases as the speed of the visual object increases.

* * * * *